(12) United States Patent
Jiang et al.

(10) Patent No.: US 12,192,540 B2
(45) Date of Patent: Jan. 7, 2025

(54) VIDEO PROCESSING METHOD AND APPARATUS, STORAGE MEDIUM, AND DEVICE

(71) Applicant: BEIJING YOUZHUJU NETWORK TECHNOLOGY CO., LTD., Beijing (CN)

(72) Inventors: Yuechun Jiang, Beijing (CN); Aiqing Dong, Beijing (CN); Yiming Fan, Beijing (CN); Xiaoshuai Cao, Beijing (CN); Ke Deng, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/263,077

(22) PCT Filed: Jan. 25, 2022

(86) PCT No.: PCT/CN2022/073617
§ 371 (c)(1),
(2) Date: Jul. 26, 2023

(87) PCT Pub. No.: WO2022/161328
PCT Pub. Date: Aug. 4, 2022

(65) Prior Publication Data
US 2024/0121451 A1    Apr. 11, 2024

(30) Foreign Application Priority Data
Jan. 26, 2021    (CN) .......................... 202110114682.9

(51) Int. Cl.
*H04N 21/233*    (2011.01)
*H04N 21/439*    (2011.01)
(Continued)

(52) U.S. Cl.
CPC ......... *H04N 21/233* (2013.01); *H04N 21/439* (2013.01); *H04N 21/44008* (2013.01); *H04N 21/854* (2013.01)

(58) Field of Classification Search
CPC ........... H04N 21/439; H04N 21/44008; H04N 21/854
See application file for complete search history.

(56) References Cited

U.S. PATENT DOCUMENTS

2015/0199978 A1    7/2015    McCoy et al.

FOREIGN PATENT DOCUMENTS

| CN | 105611337 A | * | 5/2016 | ....... H04N 21/26241 |
| CN | 106060424 A | | 10/2016 | |

(Continued)

OTHER PUBLICATIONS

International Search Report issued Mar. 30, 2022 for International Application No. PCT/CN20212/073617, English translation (6 pages).

(Continued)

*Primary Examiner* — Nnenna N Ekpo

(57) ABSTRACT

A method includes steps described below. In response to detecting that a voice-over entry corresponding to an online video is triggered, a voice-over recording page corresponding to the online video is provided for a voice-over actor-side client; the online video is played on the voice-over recording page, and speech information of a voice-over actor collected by the voice-over actor-side client in a process of playing a target video clip which does not include a speech feature in the online video is acquired; a corresponding voice-over video is generated according to the speech information and the online video; the voice-over video is sent to an uploader-side client corresponding to the online video for review by an uploader, and a review result fed back by the uploader-side client is received; and in response to deter- (Continued)

mining that the review result satisfies a preset requirement, the voice-over video is published.

19 Claims, 8 Drawing Sheets

(51) Int. Cl.
*H04N 21/44* (2011.01)
*H04N 21/854* (2011.01)

(56) References Cited

FOREIGN PATENT DOCUMENTS

| | | | | |
|---|---|---|---|---|
| CN | 106911900 A | | 6/2017 | |
| CN | 107293286 A | | 10/2017 | |
| CN | 110087129 A | | 8/2019 | |
| CN | 110650366 A | * | 1/2020 | ........... H04N 21/233 |
| CN | 111359209 A | | 7/2020 | |
| CN | 111435600 A | | 7/2020 | |
| CN | 112261435 A | | 1/2021 | |
| CN | 112954390 A | | 6/2021 | |
| WO | 2018095219 A1 | | 5/2018 | |
| WO | 2019124575 A1 | | 6/2019 | |

OTHER PUBLICATIONS

First Office Action issued Aug. 10, 2022 in Chinese Application No. 202110114682.9, English translation (12 pages).
Second Office Action issued Feb. 5, 2023 in Chinese Application No. 202110114682.9, English translation (12 pages).

* cited by examiner

VIDEO PROCESSING METHOD AND APPARATUS, STORAGE MEDIUM, AND DEVICE

CROSS-REFERENCES TO RELATED APPLICATIONS

This is a national stage application filed under 35 U.S.C. 371 based on International Patent Application NO. PCT/CN2022/073617, filed on Jan. 25, 2022, which claims priority to Chinese Patent Application No. 202110114682.9 filed with the China National Intellectual Property Administration (CNIPA) on Jan. 26, 2021, the disclosures of which is are incorporated herein by reference in its entirety.

The disclosure claims priority to Chinese Patent Application No. 202110114682.9 filed with the China National Intellectual Property Administration (CNIPA) on Jan. 26, 2021, the disclosure of which is incorporated herein by reference in its entirety.

TECHNICAL FIELD

Embodiments of the present disclosure relate to the field of computer technologies, for example, a video processing method and apparatus, a storage medium and a device.

BACKGROUND

With the rapid development of the network technology, watching online videos has become one of the main forms of leisure and entertainment for people. There are a wide variety of online videos, including movies, TV dramas or variety shows provided by video websites or platforms, as well as self-made short films or self-made short-form videos published by video content creators in video sharing platforms, especially some short-form video social platforms and personalized video recommendation platforms which have gained increasing popularity among users.

Ordinary users can enjoy the pleasure brought by these online videos through sense organs. For example, these visual arts make us laugh, bring us warmth, trigger our thinking about life and ourselves, or lead us to see the unknown world. However, blind or visually impaired people are left out of visual works, as they can only hear voices and environmental sounds in videos but cannot know what exactly happened when it comes to a lot of content in the videos, such as movements of characters, that cannot be perceived by hearing; especially in some videos focusing on storytelling, blind or visually impaired people may feel confused in intermittent lines.

SUMMARY

Embodiments of the present disclosure provide a video processing method and apparatus, a storage medium and a device, so that solutions for processing online videos in the related art can be improved.

In a first aspect, an embodiment of the present disclosure provides a video processing method. The method is applied to a server side and includes steps described below.

In response to detecting that a voice-over entry corresponding to an online video is triggered, a voice-over recording page corresponding to the online video is provided for a voice-over actor-side client.

The voice-over actor-side client is controlled to play the online video on the voice-over recording page, and speech information of a voice-over actor collected by the voice-over actor-side client in a process of playing a target video clip in the online video is acquired, where the target video clip does not include a speech feature.

A corresponding voice-over video is generated according to the speech information and the online video.

The voice-over video is sent to an uploader-side client corresponding to the online video for review by an uploader, and a review result fed back by the uploader-side client is received.

In response to determining that the review result satisfies a preset requirement, the voice-over video is published.

In a second aspect, an embodiment of the present disclosure provides a video processing method. The method is applied to a voice-over actor-side client and includes steps described below.

In response to a trigger operation by a voice-over actor on a voice-over entry corresponding to an online video, trigger information is sent to a server side, where the trigger information is used for instructing the server side to confirm that it is detected that the voice-over entry corresponding to the online video is triggered.

In response to a voice-over recording page display instruction for the online video sent by the server side, a voice-over recording page corresponding to the online video is loaded and displayed.

Video stream data corresponding to the online video sent by the server side is received, and the online video is played on the voice-over recording page.

Speech information of the voice-over actor is collected in a process of playing a target video clip in the online video, where the target video clip does not include a speech feature.

The collected speech information is sent to the server side, where the speech information is used for instructing the server side to perform: generating a corresponding voice-over video according to the speech information and the online video, sending the voice-over video to an uploader-side client corresponding to the online video for review by an uploader, receiving a review result fed back by the uploader-side client, and in response to determining that the review result satisfies a preset requirement, publishing the voice-over video.

In a third aspect, an embodiment of the present disclosure provides a video processing method. The method is applied to an uploader-side client and includes steps described below.

A voice-over video sent by a server side is received, where the voice-over video is generated by the server side according to speech information of a voice-over actor and an online video uploaded by an uploader, the speech information is collected by a voice-over actor-side client in a process of playing a target video clip in the online video, and in a case where the server side detects that a voice-over entry corresponding to the online video is triggered, a voice-over recording page corresponding to the online video is provided for the voice-over actor-side client and the voice-over actor-side client is controlled to play the online video on the voice-over recording page, where the target video clip does not include a speech feature.

The voice-over video is played and the uploader is instructed to review the voice-over video.

A review result input by the uploader is received, and the review result is fed back to the server side, where the review result is used for instructing the server side to publish the voice-over video in a case where the review result satisfies a preset requirement.

In a fourth aspect, an embodiment of the present disclosure provides a video processing apparatus. The apparatus is configured at a server side and includes a voice-over recording page provision module, a speech information acquisition module, a voice-over video generation module, a review result reception module and a voice-over video publishing module.

The voice-over recording page provision module is configured to, in response to detecting that a voice-over entry corresponding to an online video is triggered, provide a voice-over recording page corresponding to the online video for a voice-over actor-side client.

The speech information acquisition module is configured to control the voice-over actor-side client to play the online video on the voice-over recording page, and acquire speech information of a voice-over actor collected by the voice-over actor-side client in a process of playing a target video clip in the online video, where the target video clip does not include a speech feature.

The voice-over video generation module is configured to generate a corresponding voice-over video according to the speech information and the online video.

The review result reception module is configured to send the voice-over video to an uploader-side client corresponding to the online video for review by an uploader, and receive a review result fed back by the uploader-side client.

The voice-over video publishing module is configured to, in response to determining that the review result satisfies a preset requirement, publish the voice-over video.

In a fifth aspect, an embodiment of the present disclosure provides a video processing apparatus. The apparatus is configured at a voice-over actor-side client and includes a trigger information sending module, a voice-over recording page display module, an online video playing module, a speech information acquisition module and a speech information sending module.

The trigger information sending module is configured to, in response to a trigger operation by a voice-over actor on a voice-over entry corresponding to an online video, send trigger information to a server side, where the trigger information is used for instructing the server side to confirm that it is detected that the voice-over entry corresponding to the online video is triggered.

The voice-over recording page display module is configured to, in response to a voice-over recording page display instruction for the online video sent by the server side, load and display a voice-over recording page corresponding to the online video.

The online video playing module is configured to receive video stream data corresponding to the online video sent by the server side, and play the online video on the voice-over recording page.

The speech information collection module is configured to collect speech information of the voice-over actor in a process of playing a target video clip in the online video, where the target video clip does not include a speech feature.

The speech information sending module is configured to send the collected speech information to the server side, where the speech information is used for instructing the server side to perform: generating a corresponding voice-over video according to the speech information and the online video, sending the voice-over video to an uploader-side client corresponding to the online video for review by an uploader, receiving a review result fed back by the uploader-side client, and in response to determining that the review result satisfies a preset requirement, publishing the voice-over video.

In a sixth aspect, an embodiment of the present disclosure provides a video processing apparatus. The apparatus is configured at an uploader-side client and includes a voice-over video reception module, a voice-over video playing module and a review result sending module.

The voice-over video reception module is configured to receive a voice-over video sent by a server side, where the voice-over video is generated by the server side according to speech information of a voice-over actor and an online video uploaded by an uploader, the speech information is collected by a voice-over actor-side client in a process of playing a target video clip in the online video, and in a case where the server side detects that a voice-over entry corresponding to the online video is triggered, the server side provides a voice-over recording page corresponding to the online video for the voice-over actor-side client and controls the voice-over actor-side client to play the online video on the voice-over recording page, where the target video clip does not include a speech feature;

The voice-over video playing module is configured to play the voice-over video and instruct the uploader to review the voice-over video.

The review result sending module is configured to receive a review result input by the uploader, and feed back the review result to the server side, where the review result is used for instructing the server side to publish the voice-over video in a case where the review result satisfies a preset requirement.

In a seventh aspect, an embodiment of the present disclosure provides a computer-readable storage medium storing a computer program which, when executed by a processor, causes the processor to implement the video processing method according to the embodiments of the present disclosure.

In an eighth aspect, an embodiment of the present disclosure provides a computer device. The computer device includes a memory, a processor and a computer program stored in the memory and executable by the processor. The computer program, when executed by the processor, causes the processor to implement the video processing method according to the embodiments of the present disclosure.

DETAILED DESCRIPTION

Embodiments of the present disclosure are described in more detail hereinafter with reference to the drawings. The drawings illustrate some embodiments of the present disclosure, but it is to be understood that the present disclosure may be implemented in various manners and should not be construed as being limited to the embodiments set forth herein. On the contrary, these embodiments are provided to facilitate more thorough and complete understanding of the present disclosure. It is to be understood that the drawings and embodiments of the present disclosure are merely illustrative and are not intended to limit the scope of the present disclosure.

It is to be understood that steps described in method embodiments of the present disclosure may be performed in a different order and/or in parallel. Additionally, the method embodiments may include additional steps and/or omit some of the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Definitions of other terms are given in the description hereinafter.

It is to be noted that references to "first", "second" and the like in the present disclosure are merely intended to distinguish one from another apparatus, module or unit and are not intended to limit the order or interrelationship of the functions performed by the apparatus, module or unit.

It is to be noted that references to "one" and "a plurality" mentioned in the present disclosure are intended to be illustrative and not limiting; those skilled in the art should understand that "one" or "a plurality" should be understood as "one or more" unless clearly expressed in the context.

The names of messages or information exchanged between apparatuses in the embodiments of the present disclosure are only used for illustrative purposes and are not intended to limit the scope of the messages or information.

Example features and examples are provided in each of the multiple embodiments described below. Multiple features described in the embodiments may be combined to form multiple example solutions. Each numbered embodiment should not be regarded as only one solution.

Figure 1:
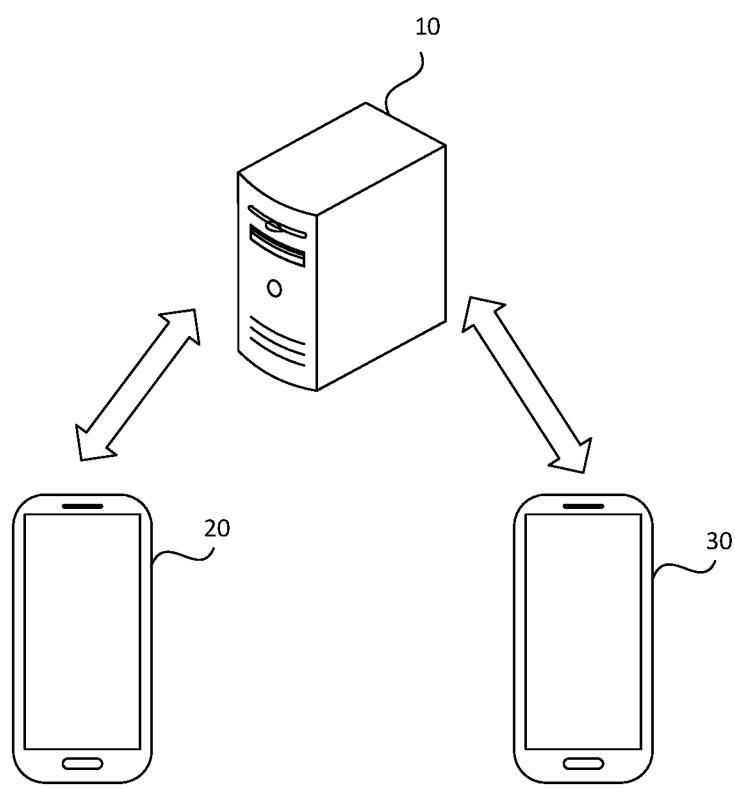
FIG. 1 is a scene architecture diagram of an application scene of a video processing method according to an embodiment of the present disclosure.

FIG. 1 is a scene architecture diagram of an application scene of a video processing method according to an embodiment of the present disclosure. For example, referring to FIG. 1, the application scene may include a server side 10, a first client 20 and a second client 30. The server side 10 may be understood as a server side corresponding to an online video platform. The specific type of online videos in the embodiment of the present disclosure is not limited. For example, the online videos may include original short films, short-form videos or micro films which are uploaded by users (such as video content creators) of the online video platform. The first client 20 may be understood as a client used by a video uploader and may be referred to as an uploader side. The second client 30 may be understood as a client used by a voice-over actor and may be referred to as a voice-over actor side. The number and specific type of first clients 20 and second clients 30 (only one first client 20 and one second client 30 are shown as schematic illustration) are not limited in the embodiment of the present disclosure. Generally, a large number of users are served by the platform, so that a large number of first clients 20 and second clients 30 generally exist, specifically including, but not limited to, mobile devices such as mobile phones, tablets and laptops, as well as other devices such as desktop computers. The uploader may use the first client 20 to shoot a video and upload the video to the server side 10. After the video is published and becomes an online video, the server side 10 may provide the second client 30 with a voice-over recording page corresponding to the online video. The voice-over actor may add a voice-over to the online video orally through the second client 30. The server side 10 generates a corresponding voice-over video and sends the voice-over video to the first client 20 for review by the uploader, and the server side 10 decides whether to publish the voice-over video according to a review result. If the voice-over video is published, other users can view the voice-over video.

Figure 2:
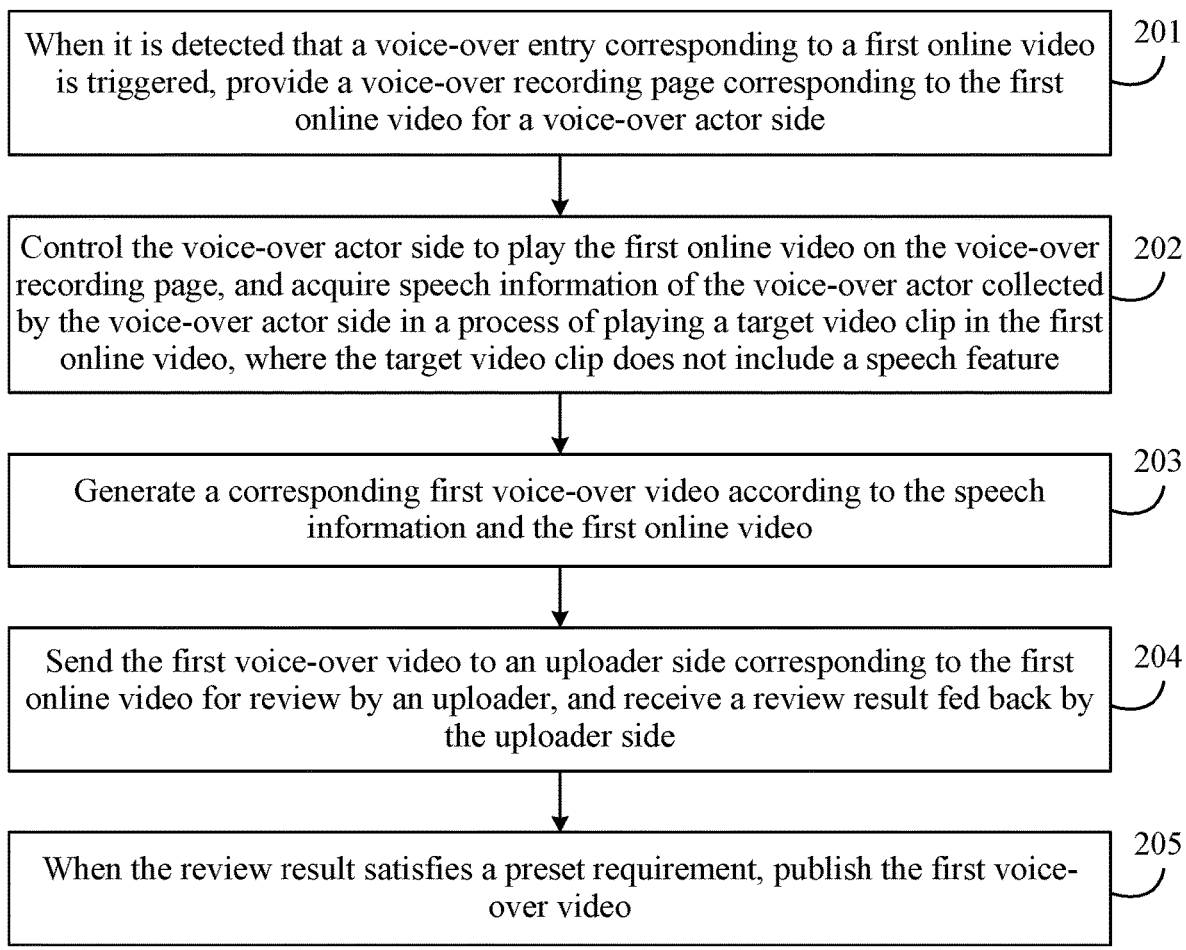
FIG. 2 is a flowchart of a video processing method according to an embodiment of the present disclosure.

FIG. 2 is a flowchart of a video processing method according to an embodiment of the present disclosure. The method is applicable to an application scene where speech information is added to an online video, and may be executed by a video processing apparatus on a server side. The apparatus may be implemented by software and/or hardware, and may generally be integrated into computer devices such as servers. As shown in FIG. 2, the method includes steps described below.

In step 201, when it is detected that a voice-over entry corresponding to a first online video is triggered, a voice-over recording page corresponding to the first online video is provided for a voice-over actor side.

Exemplarily, after the first online video is published, a user can view the first online video on a corresponding page. The corresponding page may be, for example, a video recommendation page, a home page of an application, a video search page or a page of personal works of an uploader. The presentation manner of the first online video is not limited, for example, a video title, a video title and a video cover, or a video title and a video content excerpt which is dynamically played. The voice-over entry may be presented within a preset region range (such as a region directly below or above a presentation region of the first online video) of the presentation region of the first online video. The voice-over entry may be a control with words of "add a voice-over" or the like. As the voice-over entry is a new function, guidance information may be added during the initial use of the function to help users understand and use the function. A trigger manner of the voice-over entry may be preset; for example, the preceding control may be triggered through a preset gesture operation (such as clicking). That is, if a preset gesture operation of the user on the voice-over entry is detected, it is considered that the voice-over entry corresponding to the first online video is triggered. At this time, the user may be considered as the user who wants to add a voice-over to the first online video, that is, the user is a voice-over actor. Subsequently, the voice-over recording page corresponding to the first online video may be provided for the voice-over actor side. Exemplarily, a display page on the voice-over actor side may be switched from a presentation page of the first online video to the voice-over recording page.

In step 202, the voice-over actor side is controlled to play the first online video on the voice-over recording page, and speech information of the voice-over actor collected by the voice-over actor side in a process of playing a target video clip in the first online video is acquired, where the target video clip does not include a speech feature.

Exemplarily, video stream data corresponding to the first online video may be sent to the voice-over actor side so that the first online video is played on the voice-over recording page of the voice-over actor side. For example, in the playing process, operation options such as pause, fastforward and rewind may be provided for the voice-over actor to perform selective operations, which is easier for the voice-over actor to locate an appropriate position for adding the voice-over.

Exemplarily, the target video clip not including a speech feature may be understood as a video clip to be added a voice-over. Some or all of video content in the first online video may include a speech feature, such as a dialogue of characters, singing or a narrative. The part that includes speech features can be heard by blind or visually impaired people or users who have difficulty watching video images; therefore, the part that includes speech features does not need a voice-over. The video clip that does not include a speech feature may be determined as the target video clip. It is to be noted that if no speech feature exists in the first online video, the entire first online video may be the target video clip.

The present disclosure does not limit the length of the target video clip and the number of target video clips. For example, before the first online video is played on the voice-over recording page, the step in which the video content in the first online video is parsed and the target video clip to be added a voice-over is determined is further included. For example, speech features in the video content may be recognized, the first online video is segmented based on a recognition result, and a clip that does not include a speech feature is determined as the target video clip. The specific segmentation manner is not limited. For example, if the duration of a clip that does not include a speech feature is less than a preset duration threshold (such as 2 seconds), this clip may be ignored. That is, if the duration of a clip that does not include a speech feature and is obtained after the segmentation operation is greater than or equal to a preset duration threshold, this clip may be determined as the target video clip. In addition, the target video clip may also be defined by the uploader. For example, a target video clip marking tool may be provided for the uploader side. The uploader uses this marking tool to mark a start position and an end position of the clip which the uploader wants to add speech information to, and sends a marking result to the server side. After receiving the marking result, the server side determines the target video clip according to the marking result. The server side may also notify the voice-over actor side of a playing position of the target video clip in the first online video.

Exemplarily, in the playing process of the first online video, the voice-over actor may dictate corresponding description information based on the understanding of the video content by the voice-over actor. A sound collecting device such as a microphone is used on the voice-over actor side to collect the voice of the voice-over actor, and thus the speech information (may also be referred to as oral information) of the voice-over actor is obtained.

Exemplary, the voice-over actor side may be instructed to selectively collect the speech information of the voice-over actor in the process of playing the first online video. For example, the voice-over actor side only collects the speech information in the process of playing the target video clip; or the voice-over actor side may also be instructed to collect the speech information of the voice-over actor throughout the process of playing the first online video, extract corresponding speech information according to a start time point and an end time point which correspond to the target video clip and send the corresponding speech information to the server side; or the voice-over actor side may also be instructed to collect the speech information of the voice-over actor throughout the process of playing the first online video and send all of the speech information to the server side for extraction by the server side. Therefore, the server side can acquire the speech information of the voice-over actor which is collected in the process of playing the target video clip in the first online video and by the voice-over actor side.

In step 203, a corresponding first voice-over video is generated according to the speech information and the first online video.

Exemplarily, after the speech information is acquired, a synthesis processing may be performed on the speech information and the first online video. In the synthesis process, a timestamp of the speech information and a corresponding timestamp in the first online video are aligned to ensure a certain matching degree between the content described in the speech information and video images on a timeline. The specific details of the synthesis process are not limited. For example, the synthesis processing may be performed while the speech information is acquired so that the generation efficiency of the first voice-over video is improved. The preceding speech information may be oral information, and the voice-over video may be referred to as an oral video.

In step 204, the first voice-over video is sent to an uploader side corresponding to the first online video for review by an uploader, and a review result fed back by the uploader side is received.

Exemplarily, a video uploaded by an uploader is generally a personal original video, and a voice-over video is a work adapted by a voice-over actor based on the work of the uploader. To avoid relevant legal disputes, the publishing of the voice-over video requires the consent from the uploader. Therefore, the server side in the embodiment of the present disclosure provides a bridge for interaction between the uploader and the voice-over actor. After the first voice-over video is generated, the first voice-over video is sent to the uploader for review, and then the uploader may return a review result of the uploader to the server side. For example, the review result may include consenting to or not consenting to publishing, or may include other information such as a satisfaction score or a classification tag, which is not specifically limited. For example, multiple voice-over actors may add voice-overs to the first online video, and the uploader may receive multiple versions of voice-over videos. In this case, the uploader may select several satisfactory ones or the most satisfactory one from the multiple versions of voice-over videos and feed back review results separately. At this time, the review results include being selected by the uploader and being not selected by the uploader.

In step 205, when the review result satisfies a preset requirement, the first voice-over video is published.

Exemplarily, the preset requirement may be determined according to information included in the review result. For example, when the review result includes consenting to publishing or not consenting to publishing, the preset requirement may be that the review result includes consenting to publishing. For another example, when the review result includes a satisfaction score, the preset requirement may be that the satisfaction score is greater than a preset satisfaction score threshold.

Exemplarily, when the review result satisfies the preset requirement, the first voice-over video may be published, and an audience side can view and play the first voice-over video. For example, the first voice-over video may be displayed on the audience side on a video recommendation page, a home page of an application, a video search page, a page of personal works of the uploader or a page of personal works of the voice-over actor. In addition, a special region may be further added for voice-over videos. For example, a voice-over video list page is added, and the first voice-over video is presented on the voice-over video list page. Blind or visually impaired people may use an operation manner supported by an audience-side terminal to control the playing of the first voice-over video, and then listen to the voice and oral speech in the voice-over video to more comprehensively understand the video content.

According to the video processing method provided in the embodiment of the present disclosure, for the online video uploaded by the video uploader, other people may be allowed, as voice-over actors, to add voice-overs to the part not including voices in the online video so that corresponding voice-over videos are generated and description information to video content is added. After the uploader reviews the voice-over videos, the voice-over video satisfying a requirement is published for an audience to listen to or watch. In this manner, for blind or visually impaired people or other audiences who have difficulty watching video images, the understanding of the video content can be enhanced. In addition, a new interactive manner based on online videos and a new playing form of online videos are provided, enriching and diversifying the functions of the online video service platform, and effectively enhancing the information transmission efficiency of the online video and extending the range of audiences.

In some embodiments, the step in which the first voice-over video is sent to the uploader side corresponding to the first online video for review by the uploader includes steps described below. A voice-over effect of the first voice-over video is assessed; and an assessment result and the first voice-over video are sent to the uploader side corresponding to the first online video for review by the uploader. In this manner, the server side may use some computer-level means to automatically assess the voice-over effect and provide reference information for review by the uploader, so as to help the uploader obtain the review result more quickly and professionally. For example, machine learning models and other means may be used for assessing the voice-over effect, and specific structures and weight parameters of the models are not limited.

In some embodiments, before the voice-over effect of the first voice-over video is assessed, the server side may also review the content of the speech information. For example, the server side reviews whether the content contains vulgar or indecent words, whether the content contains legally prohibited speech, etc. After the content passes the review, the voice-over effect is assessed.

In some embodiment, the step of assessing the voice-over effect of the first voice-over video includes assessing the voice-over effect of the first voice-over video based on at least one of following dimensions: a matching degree between oral content and video content which correspond to the same target video clip, a matching degree between voice-over duration and video duration which correspond to the same target video clip, an overlap degree between oral content of the target video clip and lines in the first online video, or whether a voice-over tone satisfies a preset tone requirement. In this manner, the assessment dimension can be reasonably determined, and thus a more reasonable assessment result can be obtained quickly and accurately. To enrich the information amount of the assessment result, a combination of the preceding multiple assessment dimensions may be used for assessment. Corresponding assessment scores may be set for the multiple assessment dimensions, respectively, or weighted sum and other fusion processing may be performed on assessment scores corresponding to all assessment dimensions used, respectively, to obtain a final assessment score. In addition, other dimensions may also be combined, such as whether a difference between a voice-over volume and a dialogue volume in the video is within a preset volume difference range.

In some embodiments, the step in which the voice-over effect of the first voice-over video is assessed based on the matching degree between the oral content and the video content which correspond to the same target video clip may include the step described below. For a current target video clip, a display object that appears in the current target video clip is recognized, a described object that appears in corresponding oral content is recognized, and whether the display object and the described object are consistent is determined. If the display object and the described object are consistent, an assessment score is high; if the display object and the described object are not consistent, an assessment score is low. In this manner, the consistency between the subject of the oral content and the subject of the video content can be ensured. Exemplarily, an image recognition technology may be used for obtaining things in video images that can be described through a voice-over, including expressions and actions of characters and objects appearing in the images, as display objects. An audio recognition technology is used for obtaining an object described in the corresponding oral voice-over as a described object. There may be one or more display objects and one or more described objects. If the object described in the voice-over does not appear in the image, it can be preliminarily determined that this voice-over does not match the video content. For example, a coincidence degree between the display object and the described object may be calculated. If the coincidence degree is greater than a preset coincidence degree threshold, it can be confirmed that the display object and the described object are consistent; if the coincidence degree is smaller than or equal to a preset coincidence degree threshold, it is confirmed that the display object and the described object are not consistent. Being consistent and being not consistent may separately correspond to one assessment score. In addition, the specific assessment score may also be determined according to the coincidence degree, and a corresponding relationship between assessment scores and coincidence degrees may be preset; specific details are not limited.

In some embodiments, the step in which the voice-over effect of the first voice-over video is assessed based on the matching degree between the voice-over duration and the video duration which correspond to the same target video clip includes the step described below. For a current target video clip, whether a difference between video duration of the current target video clip and voice-over duration corresponding to the current target video clip is within a first preset duration range is determined. If the difference is within the first preset duration range, an assessment score is high; if the difference is not within the first preset duration range, an assessment score is low. In this manner, a voice-over having too short duration or too long duration can be recognized, and a reasonable assessment score is provided in the duration dimension. The first preset duration range may be set according to actual requirements. The voice-over duration may be understood as duration between the first appearance of speech information and the last appearance of speech information after the playing of the last target video clip of the current target video clip ends and before the playing of the next target video clip of the current target video clip starts. When the voice-over duration is greater than the video duration, the difference is smaller than 0, which may cause the oral speech to overlap the original voice in the video and thus affect the voice-over effect; when the voice-over duration is much less than the video duration (for example, the voice-over duration is less than a preset proportion of the video duration, such as ⅓ of the video duration), it is indicated that the speech information is not rich enough to clearly and completely describe the video content, which also affects the voice-over effect. For example, the first preset duration range may range from 0 to a product of the video duration and the preset proportion.

In some embodiments, the step in which the voice-over effect of the first voice-over video is assessed based on the overlap degree between the oral content of the target video clip and the lines in the first online video includes the step described below. For a current target video clip, whether an overlap degree between oral content corresponding to the current target video clip and lines within a preset range of the first online video is less than a preset overlap degree threshold is determined. If the overlap degree is less than the preset overlap degree threshold, an assessment score is high; if the overlap degree is not less than the preset overlap degree threshold, an assessment score is low. The preset range includes a second preset duration range before the current target video clip and a third preset duration range after the current target video clip. In this manner, a voice-over having too less amount of information can be recognized, and a reasonable assessment score is provided in the dimension of the amount of information. The second preset duration range and the third preset duration range may be set according to actual requirements, and the second preset duration range and the third preset duration range may be equal or unequal, which may be determined by referring to the length of the target video clip. If the overlap degree between the oral content and the lines appearing near the current target video clip is relatively high, it is indicated that the oral content has less amount of information and a poor voice-over effect. Therefore, the assessment score may be lower.

In some embodiment, the step in which the voice-over effect of the first voice-over video is assessed based on whether the voice-over tone satisfies the preset tone requirement includes the step described below. For a current target video clip, whether a fluctuation of voice-over pitch corresponding to the current target video clip is within a preset fluctuation range is determined, and if the fluctuation is within the preset fluctuation range, an assessment score is high; if the fluctuation is not within the preset fluctuation range, an assessment score is low. In this manner, whether the voice-over tone is too mechanical or too fluctuant can be recognized, and a reasonable assessment score is provided in the tone dimension. For example, a variance or a standard deviation of the voice-over pitch may be calculated and then compared with a corresponding threshold so that whether the fluctuation of the voice-over pitch is within the preset fluctuation range is determined.

In some embodiments, after the voice-over effect of the first voice-over video is assessed, the step described below is further included. If a first target video clip of which a voice-over tone does not satisfy the preset tone requirement exists, the voice-over tone corresponding to the first target video clip is adjusted by using a preset audio technology so that an adjusted first voice-over video is obtained, and an assessment result is re-determined. The step in which the assessment result and the first voice-over video are sent to the uploader side corresponding to the first online video for review by the uploader includes the step described below. The re-determined assessment result and the adjusted first voice-over video are sent to the uploader side corresponding to the first online video for review by the uploader. When the voice-over tone does not satisfy the preset tone requirement, an audio processing technology may be used for automatically adjusting the voice-over tone to improve the assessment score, so that the probability of the voice-over video passing the review is increased, reworking by the voice-over actor can also be avoided, and thus the efficiency of publishing the voice-over video is improved. For the case where the fluctuation of the voice-over pitch is relatively small, the fluctuation range may be extended; for the case where the fluctuation of the voice-over pitch is relatively large, the fluctuation range may be reduced. Of course, other adjustment manners may be used, which are not limited in the embodiment of the present disclosure.

In some embodiments, the review result includes adjustment suggestion information. After the review result fed back by the uploader is received, the method further includes steps described below. A to-be-adjusted clip in the first voice-over video is determined according to the adjustment suggestion information; the voice-over actor side is controlled to play the to-be-adjusted clip and display adjustment suggestion information corresponding to the to-be-adjusted clip on the voice-over recording page, and rerecorded speech information of the voice-over actor which is collected by the voice-over actor side in the playing process is acquired; the first voice-over video is adjusted according to the rerecorded speech information so that a corresponding adjusted first voice-over video is generated; and the adjusted first voice-over video is sent to the uploader side for review, and a new review result fed back by the uploader side is received. In this manner, the interaction between the uploader and the voice-over actor can be enhanced, the quality of the voice-over can be improved, and the efficiency of publishing the voice-over video can be improved. The adjustment suggestion information may include a serial number or a position of the target video clip that the uploader thinks needs improvement, and may include a specific adjustment manner or adjustment direction. The corresponding adjustment suggestion information is displayed while the to-be-adjusted clip is playing on the voice-over recording page, so that the voice-over actor can know why rerecording is required and how to perform rerecording; then the voice-over actor re-describes the video content of the to-be-adjusted clip in the oral manner. The to-be-adjusted clip determined according to the adjustment suggestion information may be one or more of all target video clips. If multiple to-be-adjusted clips exist, rerecording may be performed sequentially. After rerecording is completed, the voice-over in the first voice-over video may be modified, that is, the original speech information is replaced with the corresponding rerecorded speech information for the to-be-adjusted clip, and the adjusted first voice-over video is obtained and returned to the uploader side for re-review. Of course, more times of adjustment interaction may be further supported, which is not limited in the embodiment of the present disclosure.

Figure 3:
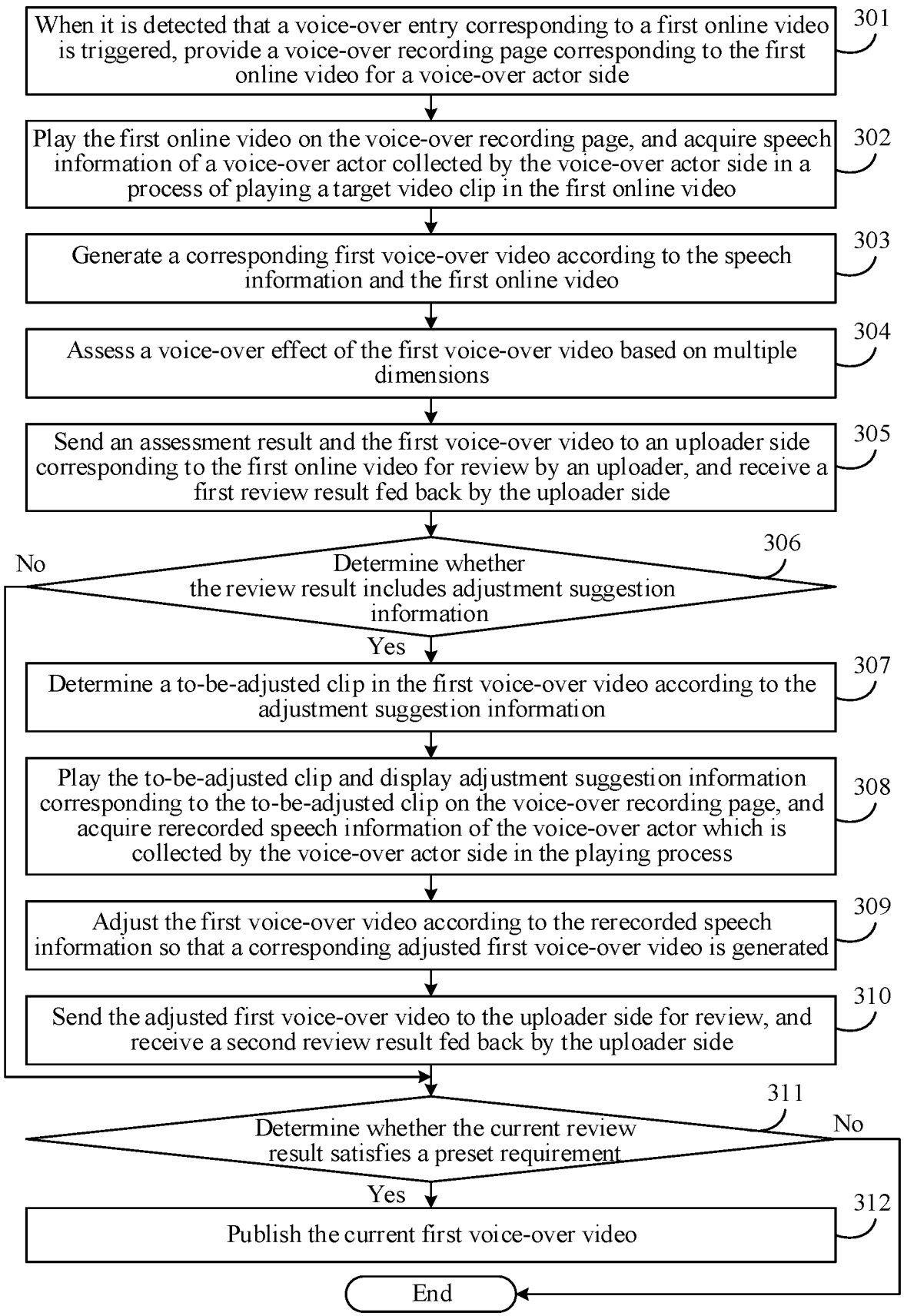
FIG. 3 is a flowchart of another video processing method according to an embodiment of the present disclosure.

FIG. 3 is a flowchart of another video processing method according to an embodiment of the present disclosure. As shown in FIG. 3, the method may include steps described below.

In step 301, when it is detected that a voice-over entry corresponding to a first online video is triggered, a voice-over recording page corresponding to the first online video is provided for a voice-over actor side.

In step 302, the first online video is played on the voice-over recording page, and speech information of a voice-over actor collected by the voice-over actor side in a process of playing a target video clip in the first online video is acquired.

Before this step, a speech feature in video content of the first online video may be recognized, the first online video is segmented based on a recognition result, and a clip that does not include a speech feature is determined as the target video clip. A start time point and an end time point of the target video clip are sent to the voice-over actor side. The start time point and the end time point are used for instructing the voice-over actor side to collect the speech information in the process of playing the target video clip.

Exemplarily, in the process of playing the target video clip on the voice-over recording page, the voice-over actor may dictate corresponding description information according to the understanding of the video content by the voice-over actor. For example, the video content in a current target video clip is a process of a boy picking up a wallet. The voice-over actor orally describes the content of images, such as "A little boy comes over and walks towards a wallet. He picks up the wallet and looks around, trying to find the owner of the wallet. At this time, a man runs to the little boy in panic;" then a dialogue between the little boy and the man appears in the video: "Uncle, is this wallet yours?", and "Yes, there is a photo of me inside;" then the voice-over actor may continue to describe the content of images, such as "The little boy opens the wallet and sees a photo of the man. He looks at the man again and confirms that he looks the same as the photo, and hands the wallet to the man with a smile." It can be seen that after the speech information is added, the video content can be more easily understood by blind or visually impaired people or users who have difficulty watching video images.

In step 303, a corresponding first voice-over video is generated according to the speech information and the first online video.

In step 304, a voice-over effect of the first voice-over video is assessed based on multiple dimensions.

The multiple dimensions correspond to a matching degree between oral content and video content which correspond to the same target video clip, a matching degree between voice-over duration and video duration which correspond to the same target video clip, an overlap degree between oral content of the target video clip and lines in the first online video, and whether a voice-over tone satisfies a preset tone requirement. For the specific assessment manners, reference may be made to the preceding related content, which is not repeated here.

In step 305, an assessment result and the first voice-over video are sent to an uploader side corresponding to the first online video for review by an uploader, and a first review result fed back by the uploader side is received.

In step 306, whether the review result includes adjustment suggestion information is determined, and if the review result includes the adjustment suggestion information, step 307 is performed; if the review result does not include the adjustment suggestion information, step 311 is performed.

For example, the action of a person in the video is tying shoelaces, but the voice-over actor mistakenly believes that the action is picking up pebbles; then the uploader may indicate this mistake in the adjustment suggestion information.

In step 307, a to-be-adjusted clip in the first voice-over video is determined according to the adjustment suggestion information.

In step 308, the to-be-adjusted clip is played and adjustment suggestion information corresponding to the to-be-adjusted clip is displayed on the voice-over recording page, and rerecorded speech information of the voice-over actor which is collected by the voice-over actor side in the playing process is acquired.

For example, a rerecording request may be sent to the voice-over actor side. If the voice-over actor side accepts the rerecording request, the corresponding voice-over recording page is provided for the voice-over actor side.

Exemplarily, as shown in the preceding example, the corresponding adjustment suggestion information may be displayed while the to-be-adjusted clip is played. For example, if the action of the person is adjusted from picking up pebbles to tying shoelaces, the voice-over actor rerecords speech information by referring to the adjustment suggestion information so that the rerecorded speech information can more accurately explain the video content, in line with the original shooting intention of the uploader.

In step 309, the first voice-over video is adjusted according to the rerecorded speech information so that a corresponding adjusted first voice-over video is generated.

In step 310, the adjusted first voice-over video is sent to the uploader side for review, and a second review result fed back by the uploader side is received.

Exemplarily, after seeing the adjusted voice-over video, the uploader can determine whether the adjustment suggestion of the uploader is adopted and applied in the new voice-over video, and then the uploader gives a new review result and feeds back the new review result to a server side.

In step 311, whether the current review result satisfies a preset requirement is determined, and if the current review result satisfies the preset requirement, step 312 is performed; if the current review result does not satisfy the preset requirement, the flow ends.

For example, if the current review result does not satisfy the preset requirement, the voice-over actor side may be notified of that the review is not passed, or a specific reason for failure may also be sent to the voice-over actor side.

In step 312, the current first voice-over video is published.

According to the video processing method provided in the embodiment of the present disclosure, based on the preceding multiple embodiments, before the first voice-over video is sent to the uploader for review, the voice-over effect is first assessed based on multiple dimensions; then the first voice-over video and the assessment result are sent together to the uploader for review, providing review reference information for the uploader; the uploader may also provide a review suggestion of the uploader in the review process as the adjustment suggestion information fed back to the server side; the server side determines the to-be-adjusted clip according to the adjustment suggestion information and instructs the voice-over actor to rerecord the speech information corresponding to the to-be-adjusted clip by referring to the adjustment suggestion information so that the rerecorded speech information can more accurately explain the video content and be in line with the original shooting intention of the uploader. Through the preceding improvements, the interaction flow based on the voice-over video can be further improved, and the quality of the voice-over video and the efficiency of publishing the voice-over video can be further improved.

In some embodiments, before the voice-over actor side is controlled to play the first online video on the voice-over recording page, the steps described below are further included. Text description information corresponding to the target video clip is acquired. The text description information is obtained by recognizing video content of the target video clip through a preset machine learning model, or the text description information is provided by the uploader; and correspondingly, while the voice-over actor side is controlled to play the target video clip on the voice-over recording page, the step in which the voice-over actor side is controlled to display the text description information corresponding to the currently played target video clip on the voice-over recording page, and the voice-over actor is instructed to provide a voice-over referring to the text description information is further included. The voice-over actor may be casual when providing the voice-over. If the text description information is provided for the voice-over actor for reference, serious deviations from the video content can be avoided and the quality of the voice-over can be improved. In addition, the voice-over actor can be helped view in advance what happens in a short time after a current video image through text description information, so as to have a preliminary judgement on the event occurrence process and the continuity of actions, so that the efficiency of providing the voice-over is improved.

Exemplarily, the preset machine learning model may be used for recognizing the video content of the target video clip, and corresponding description information may be automatically generated according to expressions and actions of characters and objects appearing in the images which are included in the video content. In addition, the video uploader may have some unique understanding or interpretation of the work of the video uploader, so that the uploader may input text description information and send the text description information to the server side.

In some embodiments, before it is detected that the voice-over entry corresponding to the first online video is triggered, the steps described below are further included. A voice-over adding request for the first online video sent by the voice-over actor side is received, and the voice-over adding request is forwarded to the uploader side; and when voice-over authorization information from the uploader side is received, the voice-over entry corresponding to the first online video is opened to the voice-over actor side. When uploading a video, the uploader may not consider the need to add speech information to the video; however, other users may think, after watching the video, that the content of the video is exciting but blind or visually impaired people and other people cannot perceive this exciting content, and thus may have a desire to provide voice-overs. To satisfy the voice-over need of users, a way to request opening of the voice-over entry from the uploader is provided for voice-over actors, so that the output of voice-over videos is improved, and richer and more diverse voice-over videos are provided for blind or visually impaired people and other people. In addition, the voice-over adding request may include attribute information of a voice-over actor and the like to help the uploader select an appropriate voice-over actor for voice-over authorization.

In some embodiments, before it is detected that the voice-over entry corresponding to the first online video is triggered, the steps described below are further included. A voice-over entry opening request for the first online video sent by the uploader side is received; a voice-over invitation is sent to the voice-over actor side according to the voice-over entry opening request; and after it is detected that the voice-over actor accepts the voice-over invitation, the voice-over entry corresponding to the first online video is provided for the voice-over actor side. In this manner, the opening of the voice-over entry can be initiated by the uploader, and after the opening, other users may be invited to add voice-overs to the online video, so that the rate of the conversion from online videos to voice-over videos is improved. The voice-over invitation may be sent to all users or designated users of the platform, which is not specifically limited. The designated users may be designated by the uploader, or may be determined through automatic matching by the server side according to the first online video and/or the uploader.

In some embodiments, after the first voice-over video is published, the step described below is further included. The first voice-over video corresponding to the first online video is played on an audience side. After the first voice-over video is published, the first voice-over video is allowed to be played on the audience side, so that an audience can experience the fun brought by the voice-over video and can better understand the content in the online video.

In some embodiments, the step in which the first voice-over video corresponding to the first online video is played on the audience side includes the step described below. In the process of playing the first online video on the audience side, when it is detected that a preset switching condition is satisfied, the first voice-over video is switched to for playing. In this manner, scenes that require voice-over video playing can be recognized, and the switching from the ordinary online video to the voice-over video is automatically performed. The preset switching condition may be set according to actual requirements. For example, the preset switching condition includes: detecting that the audience side receives a first operation that conforms to an operation manner for blind or visually impaired people; detecting that the audience side receives a preset speech switching command; or determining that the audience side detects no gaze information of a current audience within preset duration.

Exemplarily, many terminal operating systems currently offer special operation manners to blind or visually impaired people, such as VoiceOver which is an accessibility feature for blind or visually impaired people provided in Apple's operating system and TalkBack which is an accessibility feature for blind or visually impaired people provided in Android operating systems. When an audience-side terminal receives any operation that conforms to the operation manner for blind or visually impaired people, it is indicated that the current operator is a blind or visually impaired person, and to satisfy the requirement of the blind or visually impaired person for learning the video content, the first voice-over video may be switched to for playing. If a user on the audience side has difficulty operating the terminal with hands, the user may use voice input to give a switching instruction to the terminal, so that the voice-over video is switched to for playing according to personal preferences of the user. The audience side may use an eye tracking technology to detect the gaze information of the current audience. The gazing information may be understood as a position of a gaze point. The gaze point of the user may be acquired through the method described below. A gaze direction of the user and a distance between eyes and a screen are acquired so that an angle between the gaze direction and a line perpendicular to the screen is first determined, and then the gaze information of the user is calculated through the angle and the distance between the eyes and the screen. If no gaze information of the current audience is detected within the preset duration, that is, no gaze point of the user is detected on the screen, it is indicated that the current audience does not watch the screen and may have left the screen to do other things. At this time, the current audience cannot watch the content on the screen, and the first voice-over video may be automatically switched to for playing, so that the current audience will not miss exciting content other than the voice in the video.

In some embodiments, the steps described below may be further included. Evaluation information fed back by the audience and sent by the audience side for multiple voice-over videos corresponding to the first online video is received; tag information corresponding to the multiple voice-over videos, respectively, is determined according to the evaluation information; and tag information corresponding to a current voice-over video is provided while the current voice-over video corresponding to the first online video is presented. When the same voice-over actor or multiple voice-over actors add different speech information to the first online video, multiple versions of voice-over videos can be obtained. The manner of providing tag information can help the current audience choose a preferred version to listen to; the tag information is determined according to the evaluation information fed back by the audience, so that subjective feelings of the audience can be better fit, and the accuracy of the tag information is improved.

For example, keyword extraction may be performed on the evaluation information, and candidate keywords are selected in the manner of clustering. For the current voice-over video, a candidate keyword with a frequency of occurrence higher than a preset frequency threshold in corresponding evaluation information is determined as tag information, or a preset number of candidate keywords with a relatively high frequency of occurrence are determined as tag information.

In some embodiments, the steps described below may be further included. Evaluation information fed back by the audience and sent by the audience side for multiple voice-over videos corresponding to the first online video is received; evaluation scores corresponding to the multiple voice-over videos, respectively, are determined according to the evaluation information; and voice-over adding capabilities of voice-over actors are assessed according to the evaluation scores. When voice-over actors add different voice information to the first online video, multiple versions of voice-over videos can be obtained. According to the evaluation information of the audience for the different versions of voice-over videos, corresponding evaluation scores can be obtained through quantification, and then the voice-over adding capabilities of the voice-over actors are assessed. Awards such as points or medals may be provided for voice-over actors with a high voice-over adding capability, and more opportunities for creating voice-over videos may also be provided for voice-over actors with a high voice-over adding capability, so that the functions of the online video platform are further enriched.

Figure 4:
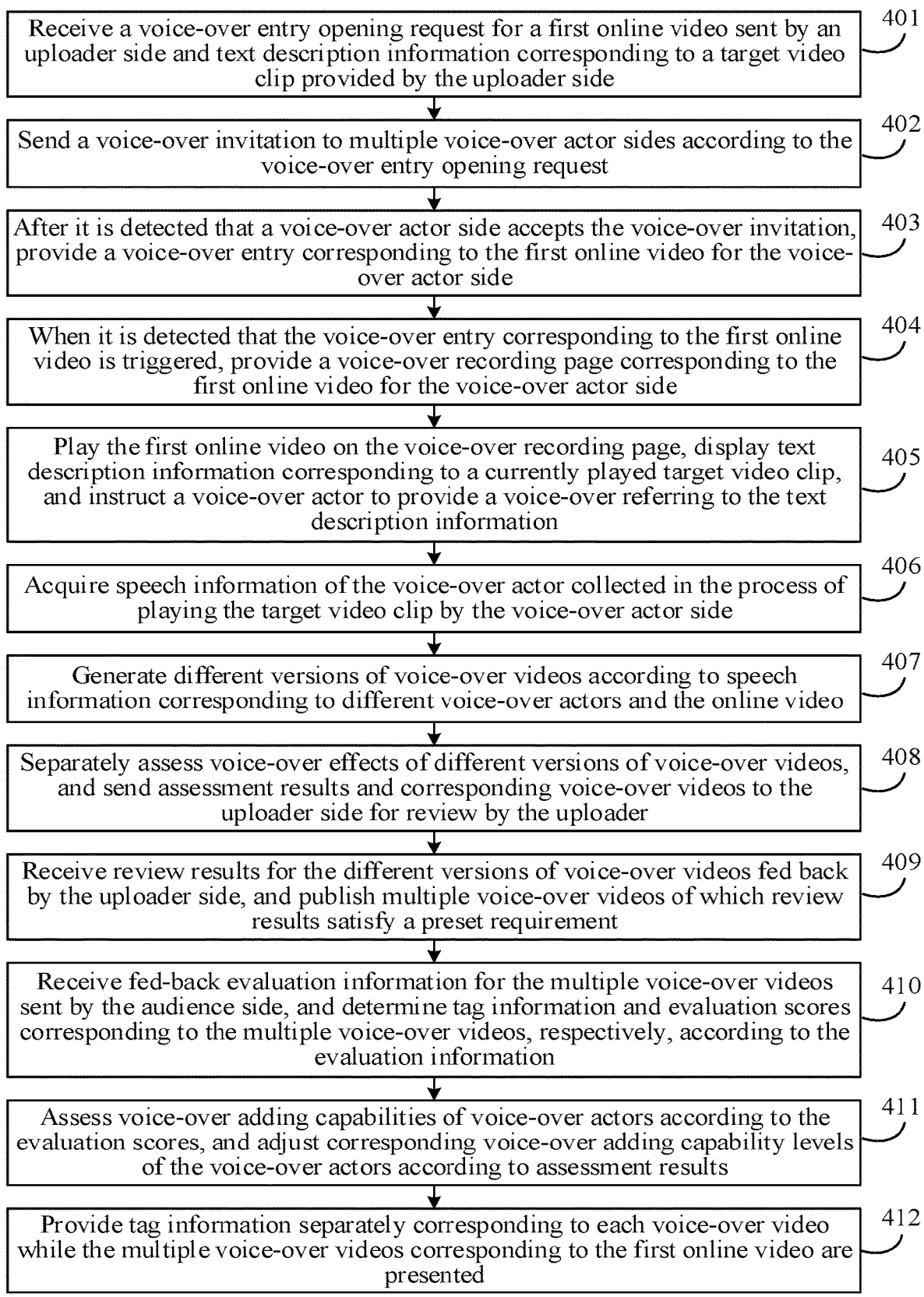
FIG. 4 is a flowchart of another video processing method according to an embodiment of the present disclosure.

FIG. 4 is a flowchart of another video processing method according to an embodiment of the present disclosure. As shown in FIG. 4, the method may include steps described below.

In step 401, a voice-over entry opening request for a first online video sent by an uploader side and text description information corresponding to a target video clip provided by the uploader side are received.

Exemplarily, the uploader side may send the voice-over entry opening request when uploading the first online video, or may send the voice-over entry opening request at any time after uploading. For example, after an uploader uploads the first online video or the voice-over entry opening request sent by the uploader side is received, a server side may automatically recognize the target video clip and prompt the uploader to add an explanation to the target video clip so that corresponding text description information is generated.

In step 402, a voice-over invitation is sent to multiple voice-over actor sides according to the voice-over entry opening request.

In step 403, after it is detected that a voice-over actor side accepts the voice-over invitation, a voice-over entry corresponding to the first online video is provided for the voice-over actor side.

It is to be noted that the voice-over invitation may be sent to multiple voice-over actor sides separately, each timing of sending the voice-over invitation may be the same or different, and time points when the multiple voice-over actor sides accept the voice-over invitation are generally different. Therefore, for a current voice-over actor side, after the current voice-over actor side accepts the voice-over invitation, the voice-over entry corresponding to the first online video may be provided for the current voice-over actor side; that is, timings of different voice-over actor sides to start voice-over recording may be different, and the voice-over processes may be independent of each other.

In step 404, when it is detected that the voice-over entry corresponding to the first online video is triggered, a voice-over recording page corresponding to the first online video is provided for the voice-over actor side.

In step 405, the first online video is played on the voice-over recording page, text description information corresponding to a currently played target video clip is displayed, and a voice-over actor is instructed to provide a voice-over referring to the text description information.

In step 406, speech information of the voice-over actor collected in the process of playing the target video clip by the voice-over actor side is acquired.

In step 407, different versions of voice-over videos are generated according to speech information corresponding to different voice-over actors and the online video.

In step 408, voice-over effects of different versions of voice-over videos are separately assessed, and assessment results and corresponding voice-over videos are sent to the uploader side for review by the uploader.

In step 409, review results for the different versions of voice-over videos fed back by the uploader side are received, and multiple voice-over videos of which review results satisfy a preset requirement are published.

In step 410, fed-back evaluation information for the multiple voice-over videos sent by the audience side is received, and tag information and evaluation scores corresponding to the multiple voice-over videos, respectively, are determined according to the evaluation information.

Exemplarily, the evaluation information may include evaluation words or evaluation speech, and may further include information generated in the form of likes or votes, which is not specifically limited. Exemplarily, after the voice-over video is successfully published, some audiences will view and listen to the voice-over video one after another. Audiences may spontaneously add evaluation information to the current voice-over video, and after a period of accumulation, tag information corresponding to different versions of voice-over videos may be determined in manners such as keyword extraction or clustering according to a certain amount of evaluation information. For evaluation scores, semantic recognition may be performed on the evaluation information so that whether the evaluation information is positive evaluation or negative evaluation is determined, and then corresponding evaluation scores are determined.

In step 411, voice-over adding capabilities of voice-over actors are assessed according to the evaluation scores, and corresponding voice-over adding capability levels of the voice-over actors are adjusted according to assessment results.

Exemplarily, quantification manners of voice-over adding capability levels may be set according to actual requirements, and may be reflected in manners of star ratings or numbers of medals. An adjustment rule of voice-over adding capability levels, for example, may be described as below. Among voice-over videos of which voice-overs are added by a voice-over actor, if the number of voice-over videos with evaluation scores exceeding a preset evaluation score threshold increases by more than a preset number threshold since the last time the voice-over adding capability level of the voice-over actor was raised, the voice-over adding capability of the voice-over actor may be continuously raised by one level.

In step 412, tag information separately corresponding to each voice-over video is provided while the multiple voice-over videos corresponding to the first online video are presented.

Exemplarily, the tag information may be text. Ordinary users may choose preferred voice-over video versions according to the text version of the tag information. Blind or visually impaired people may listen to speech information corresponding to the tag information through functions such as screen reading provided by a terminal. In addition, the tag information may also exist in the form of speech information. After a tag information reading function is triggered, the tag information separately corresponding to each voice-over video can be provided in the form of playing.

For example, a manner of multiple audio tracks may be used for generating a video file containing different versions of voice-over videos corresponding to the first online video. The multiple audio tracks may include an original audio track of the first online video, while other audio tracks may separately correspond to a version of voice-over video. When different versions of voice-over videos are selected, the different versions of voice-over videos may be played directly by switching audio tracks; or the first online video or a certain version of voice-over video may be played directly by switching audio tracks. In this manner, storage resources are saved, and the convenience and efficiency of video version switching are improved.

According to the video processing solution provided in the embodiment of the present disclosure, based on the preceding multiple embodiments, flexible conditions are set for opening the voice-over entry, and the voice-over invitation may be sent to multiple voice-over actors in the form of task releasing; in addition, the original creator of the online video may upload text description information to help voice-over actors understand the work of the original creator, improving the passing rate of review; after multiple versions of voice-over videos are published, tags may be added to the multiple versions of voice-over videos and voice-over adding capabilities of voice-over actors may be assessed according to the feedback from the audience side. In this manner, the interaction between the uploader of the online video, voice-over actors and audiences are effectively strengthened, and the functions of the online video platform is enriched; rich and diverse exciting voice-over videos are provided for blind or visually impaired people and other users who need to listen to videos while a good creation environment is provided for different types of creators, so that diverse requirements of users are satisfied.

Figure 5:
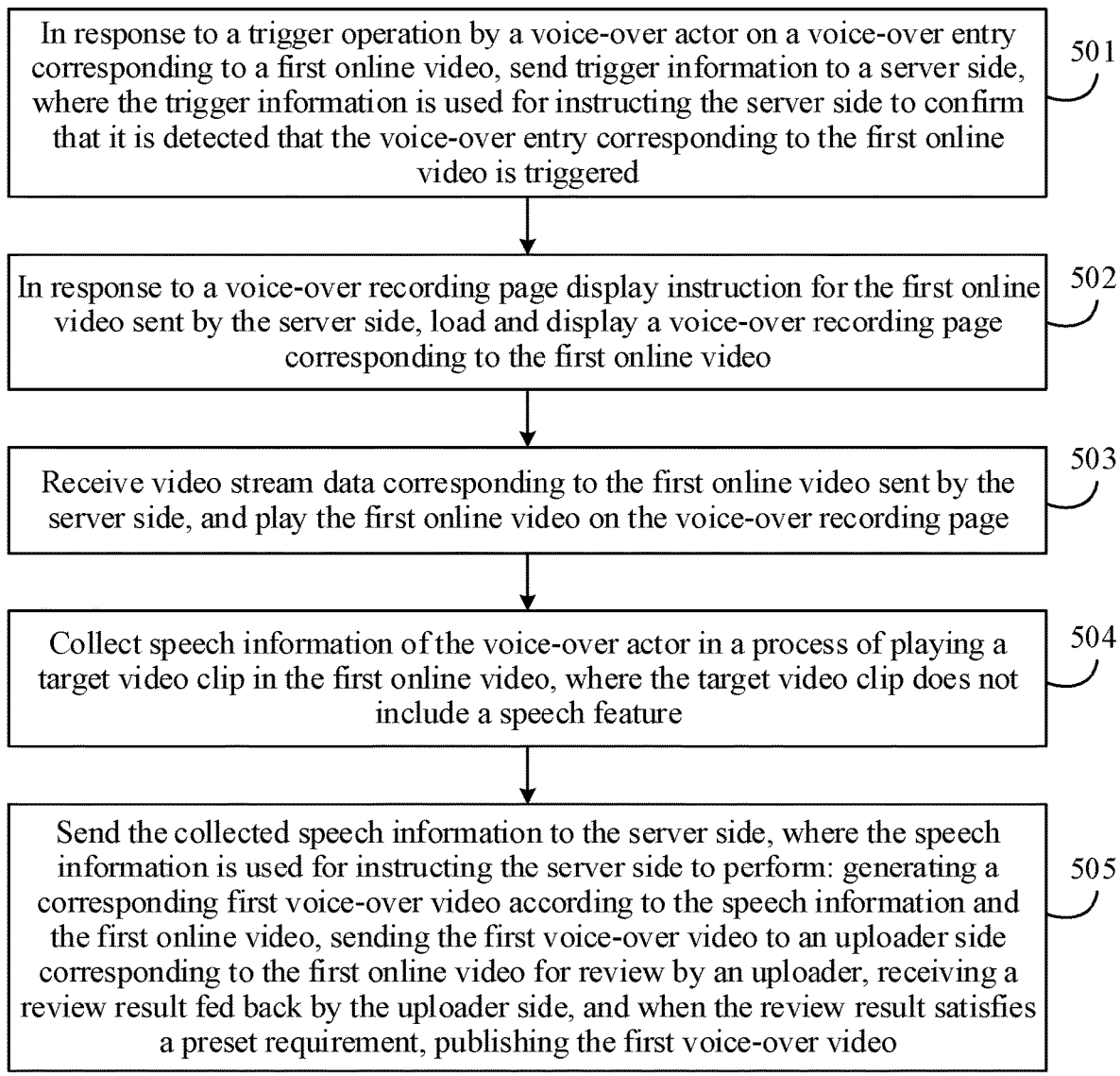
FIG. 5 is a flowchart of another video processing method according to an embodiment of the present disclosure.

FIG. 5 is a flowchart of another video processing method according to an embodiment of the present disclosure. The method is applicable to an application scene where speech information is added to an online video, and may be executed by a video processing apparatus on a voice-over actor side. The apparatus may be implemented by software and/or hardware, and may generally be integrated into computer devices. As shown in FIG. 5, the method includes steps described below.

In step 501, in response to a trigger operation by a voice-over actor on a voice-over entry corresponding to a first online video, trigger information is sent to a server side, where the trigger information is used for instructing the server side to confirm that it is detected that the voice-over entry corresponding to the first online video is triggered.

In step 502, in response to a voice-over recording page display instruction for the first online video sent by the server side, a voice-over recording page corresponding to the first online video is loaded and displayed.

In step 503, video stream data corresponding to the first online video sent by the server side is received, and the first online video is played on the voice-over recording page.

In step 504, speech information of the voice-over actor is collected in a process of playing a target video clip in the first online video, where the target video clip does not include a speech feature.

In step 505, the collected speech information is sent to the server side, where the speech information is used for instructing the server side to perform: generating a corresponding first voice-over video according to the speech information and the first online video, sending the first voice-over video to an uploader side corresponding to the first online video for review by an uploader, receiving a review result fed back by the uploader side, and when the review result satisfies a preset requirement, publishing the first voice-over video.

According to the video processing method provided in the embodiment of the present disclosure, other users other than the uploader may be allowed as voice-over actors to add voice-overs to the online video uploaded by the uploader, so that the functions of the online video playing platform are enriched, and richer interaction manners are provided for users. Moreover, the voice-over video obtained after voice-over adding is published after being reviewed by the uploader, so that for blind or visually impaired people or other audiences who have difficulty watching video images, the understanding of the video content can be enhanced, and thus the information transmission efficiency of the online video is effectively enhanced and the range of audiences is extended.

In some embodiments, before in response to the trigger operation by the voice-over actor on the voice-over entry corresponding to the first online video, the trigger information is sent to the server side, the step described below is further included. The voice-over entry is displayed within a preset region range of the presentation region of the first online video. The voice-over entry is presented, so that a user can choose an online video to which the user wants to add a voice-over and quickly access the voice-over function by triggering the voice-over entry.

In some embodiments, the review result includes adjustment suggestion information. After the collected speech information is sent to the sever side, the step described below may be further included. Video stream data corresponding to a to-be-adjusted clip sent by the server side is received, the to-be-adjusted clip is played and adjustment suggestion information corresponding to the to-be-adjusted clip is displayed on the voice-over recording page, rerecorded speech information of the voice-over actor is collected in the playing process, and the rerecorded speech information is sent to the server side. The rerecorded speech information is used for instructing the server side to adjust the first voice-over video according to the rerecorded speech information, and a corresponding adjusted first voice-over video is generated. After receiving the review result fed back by the uploader, the server side determines the to-be-adjusted clip in the first voice-over video according to the adjustment suggestion information, and sends the video stream data corresponding to the to-be-adjusted clip to the voice-over actor side. In this manner, the interaction between the uploader and the voice-over actor can be enhanced, the quality of the voice-over can be improved, and the efficiency of publishing the voice-over video can be improved.

In some embodiments, while the video stream data corresponding to the first online video sent by the server side is received, the steps described below are further included. Text description information corresponding to the target video clip sent by the server side is received; the text description information is obtained by recognizing video content of the target video clip through a preset machine learning model, or the text description information is provided by the uploader; and correspondingly, while the first online video is played on the voice-over recording page, the step in which the text description information corresponding to the currently played target video clip is displayed on the voice-over recording page, and the voice-over actor is instructed to provide a voice-over referring to the text description information is further included. In this manner, the quality of the voice-over and the efficiency of providing the voice-over can be improved.

In some embodiments, before in response to the trigger operation by the voice-over actor on the voice-over entry corresponding to the first online video, the trigger information is sent to the server side, the step described below may be further included. A voice-over adding request for the first online video is sent to the server side, where the voice-over adding request is used for instructing the server side to forward the voice-over adding request to the uploader side; when voice-over authorization information from the uploader side is received, the voice-over entry corresponding to the first online video is opened to the voice-over actor side. In this manner, voice-over requirements of users can be satisfied, and a way to request opening of the voice-over entry from the uploader is provided for voice-over actors, so that the output of voice-over videos is improved.

Figure 6:
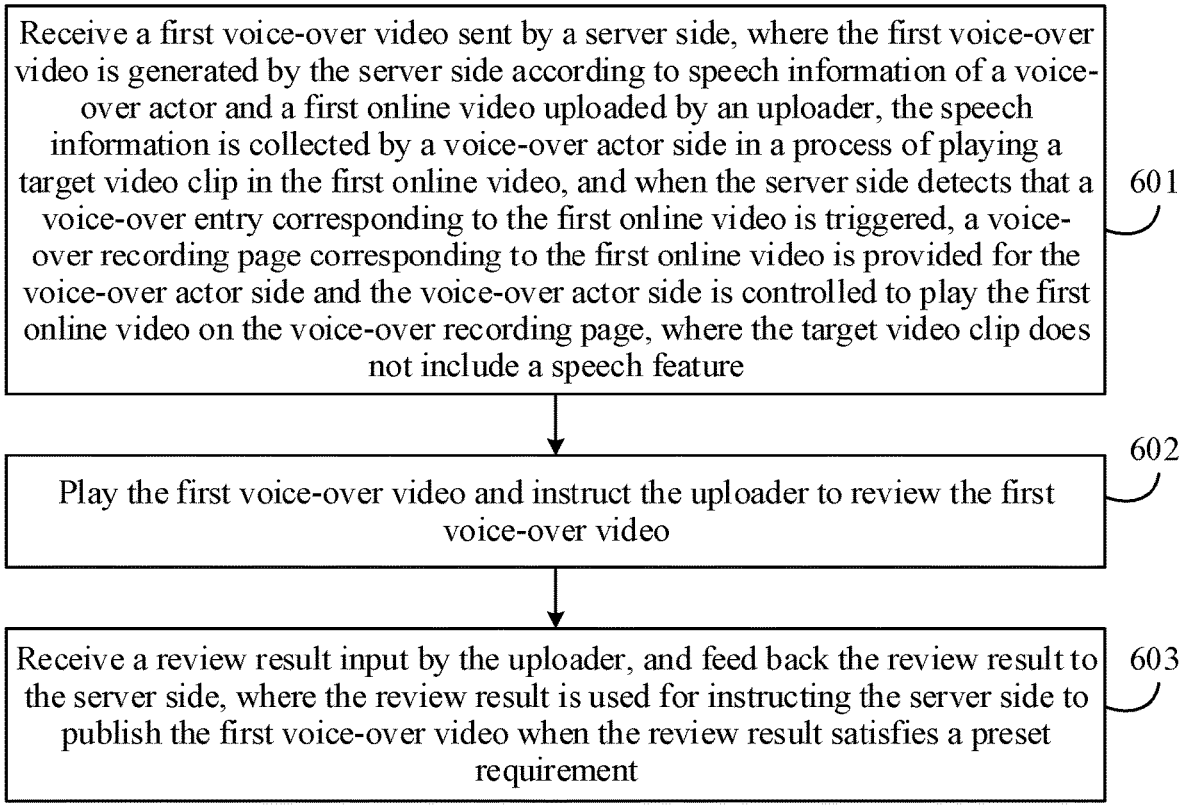
FIG. 6 is a flowchart of another video processing method according to an embodiment of the present disclosure.

FIG. 6 is a flowchart of another video processing method according to an embodiment of the present disclosure. The method is applicable to an application scene where speech information is added to an online video, and may be executed by a video processing apparatus on an uploader side. The apparatus may be implemented by software and/or hardware, and may generally be integrated into computer devices. As shown in FIG. 6, the method includes steps described below.

In step 601, a first voice-over video sent by a server side is received, where the first voice-over video is generated by the server side according to speech information of a voice-over actor and a first online video uploaded by an uploader, the speech information is collected by a voice-over actor side in a process of playing a target video clip in the first online video, and when the server side detects that a voice-over entry corresponding to the first online video is triggered, a voice-over recording page corresponding to the first online video is provided for the voice-over actor side and the voice-over actor side is controlled to play the first online video on the voice-over recording page, where the target video clip does not include a speech feature.

In step 602, the first voice-over video is played and the uploader is instructed to review the first voice-over video.

In step 603, a review result input by the uploader is received, and the review result is fed back to the server side, where the review result is used for instructing the server side to publish the first voice-over video when the review result satisfies a preset requirement.

According to the video processing method provided in the embodiment of the present disclosure, after other users other than the uploader, as voice-over actors, add voice-overs to the online video uploaded by the uploader, the uploader may review voice-over videos, and the voice-over videos may be published when the review result satisfies the preset requirement, so that the functions of the online video playing platform are enriched, and richer interaction manners are provided for users. Moreover, for blind or visually impaired people or other audiences who have difficulty watching video images, the understanding of the video content can be enhanced, and thus the information transmission efficiency of the online video is effectively enhanced and the range of audiences is extended.

In some embodiments, the review result includes adjustment suggestion information. The adjustment suggestion information is used for instructing the server side to determine a to-be-adjusted clip in the first voice-over video according to the adjustment suggestion information. The voice-over actor side is controlled to play the to-be-adjusted clip and display adjustment suggestion information corresponding to the to-be-adjusted clip on the voice-over recording page, rerecorded speech information of the voice-over actor collected in the playing process by the voice-over actor side is acquired, the first voice-over video is adjusted according to the rerecorded speech information, and a corresponding adjusted first voice-over video is generated. In this manner, the interaction between the uploader and the voice-over actor can be enhanced, the quality of the voice-over can be improved, and the efficiency of publishing the voice-over video can be improved.

In some embodiments, before the first voice-over video sent by the server side is received, the step described below is further included. Text description information corresponding to the target video clip input by the uploader is received, and the text description information is sent to the server side. In this manner, the video uploader may have some unique understanding or interpretation of the work of the uploader, which may be provided as a reference for the voice-over actor, so that the quality of the voice-over and the efficiency of providing the voice-over can be improved.

In some embodiments, before the first voice-over video sent by the server side is received, the step described below is further included. A voice-over entry opening request for the first online video is sent to the server side. The voice-over entry opening request is used for instructing the server side to send a voice-over invitation to the voice-over actor side according to the voice-over entry opening request, and after it is detected that the voice-over actor accepts the voice-over invitation, the voice-over entry corresponding to the first online video is provided for the voice-over actor side. In this manner, the uploader may actively initiate the opening of the voice-over entry, so that the rate of the conversion from online videos to voice-over videos is improved.

Figure 7:
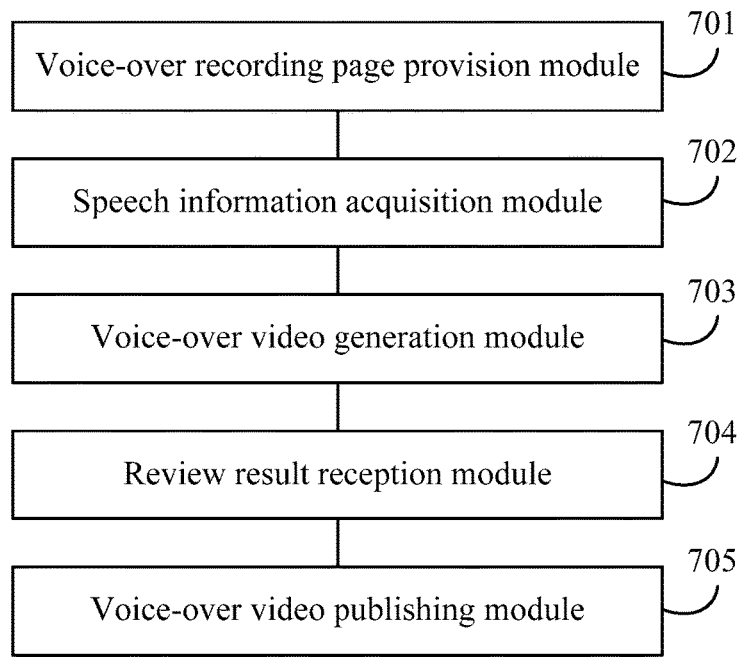
FIG. 7 is a block diagram of a video processing apparatus according to an embodiment of the present disclosure.

FIG. 7 is a block diagram of a video processing apparatus according to an embodiment of the present disclosure. The apparatus may be implemented by software and/or hardware, and may generally be integrated into computer devices. The apparatus may perform video processing by executing a video processing method. As shown in FIG. 7, the apparatus includes a voice-over recording page provision module 701, a speech information acquisition module 702, a voice-over video generation module 703, a review result reception module 704 and a voice-over video publishing module 705.

The voice-over recording page provision module 701 is configured to, when it is detected that a voice-over entry corresponding to a first online video is triggered, provide a voice-over recording page corresponding to the first online video for a voice-over actor side.

The speech information acquisition module 702 is configured to control the voice-over actor side to play the first online video on the voice-over recording page, and acquire speech information of a voice-over actor collected by the voice-over actor side in a process of playing a target video clip in the first online video, where the target video clip does not include a speech feature.

The voice-over video generation module 703 is configured to generate a corresponding first voice-over video according to the speech information and the first online video.

The review result reception module 704 is configured to send the first voice-over video to an uploader side corresponding to the first online video for review by an uploader, and receive a review result fed back by the uploader side.

The voice-over video publishing module 705 is configured to, when the review result satisfies a preset requirement, publish the first voice-over video.

According to the video processing apparatus provided in the embodiment of the present disclosure, for the online video uploaded by the video uploader, other people may be allowed, as voice-over actors, to add voice-overs to the part not including voices in the online video so that corresponding voice-over videos are generated and description information to video content is added. After the uploader reviews voice-over videos, the voice-over video satisfying a requirement is published for an audience to listen to or watch. In this manner, for blind or visually impaired people or other audiences who have difficulty watching video images, the understanding of the video content can be enhanced. In addition, a new interactive manner based on online videos and a new playing form of online videos are provided, enriching and diversifying the functions of the online video service platform, and effectively enhancing the information transmission efficiency of the online video and extending the range of audiences.

For example, the step in which the first voice-over video is sent to the uploader side corresponding to the first online video for review by the uploader includes steps described below. A voice-over effect of the first voice-over video is assessed; and an assessment result and the first voice-over video are sent to the uploader side corresponding to the first online video for review by the uploader.

For example, the step of assessing the voice-over effect of the first voice-over video includes assessing the voice-over effect of the first voice-over video based on at least one of following dimensions: a matching degree between oral content and video content which correspond to the same target video clip, a matching degree between voice-over duration and video duration which correspond to the same target video clip, an overlap degree between oral content of the target video clip and lines in the first online video, or whether a voice-over tone satisfies a preset tone requirement.

For example, the step in which the voice-over effect of the first voice-over video is assessed based on the matching degree between the oral content and the video content which correspond to the same target video clip includes the step described below. For a current target video clip, a display object that appears in the current target video clip is recognized, a described object that appears in corresponding oral content is recognized, and whether the display object and the described object are consistent is determined. If the display object and the described object are consistent, an assessment score is high; if the display object and the described object are not consistent, an assessment score is low.

The step in which the voice-over effect of the first voice-over video is assessed based on the matching degree between the voice-over duration and the video duration which correspond to the same target video clip includes the step described below. For a current target video clip, whether a difference between video duration of the current target video clip and voice-over duration corresponding to the current target video clip is within a first preset duration range is determined. If the difference is within the first preset duration range, an assessment score is high; if the difference is not within the first preset duration range, an assessment score is low.

The step in which the voice-over effect of the first voice-over video is assessed based on the overlap degree between the oral content of the target video clip and the lines in the first online video includes the step described below. For a current target video clip, whether an overlap degree between oral content corresponding to the current target video clip and lines within a preset range of the first online video is less than a preset overlap degree threshold is determined. If the overlap degree is less than the preset overlap degree threshold, an assessment score is high; if the overlap degree is not less than the preset overlap degree threshold, an assessment score is low. The preset range includes a second preset duration range before the current target video clip and a third preset duration range after the current target video clip.

The step in which the voice-over effect of the first voice-over video is assessed based on whether the voice-over tone satisfies the preset tone requirement includes the step described below. For a current target video clip, whether a fluctuation of voice-over pitch corresponding to the current target video clip is within a preset fluctuation range is determined, and if the fluctuation is within the preset fluctuation range, an assessment score is high; if the fluctuation is not within the preset fluctuation range, an assessment score is low.

For example, the apparatus further includes a tone adjustment module. The tone adjustment module is configured to, after the voice-over effect of the first voice-over video is assessed, if a first target video clip of which a voice-over tone does not satisfy the preset tone requirement exists, adjust the voice-over tone corresponding to the first target video clip by using a preset audio technology so that an adjusted first voice-over video is obtained, and an assessment result is re-determined. The step in which the assessment result and the first voice-over video are sent to the uploader side corresponding to the first online video for review by the uploader includes the step described below. The re-determined assessment result and the adjusted first voice-over video are sent to the uploader side corresponding to the first online video for review by the uploader.

For example, the review result includes adjustment suggestion information. The apparatus further includes a to-be-adjusted clip determination module, a rerecorded speech information acquisition module and a voice-over video adjustment module. The to-be-adjusted clip determination module is configured to, after the review result fed back by the uploader is received, determine a to-be-adjusted clip in the first voice-over video according to the adjustment suggestion information. The rerecorded speech information acquisition module is configured to control the voice-over actor side to play the to-be-adjusted clip and display adjustment suggestion information corresponding to the to-be-adjusted clip on the voice-over recording page, and acquire rerecorded speech information of the voice-over actor collected in the playing process by the voice-over actor side. The voice-over video adjustment module is configured to adjust the first voice-over video according to the rerecorded speech information, and generate a corresponding adjusted first voice-over video. The review result reception module is further configured to send the adjusted first voice-over video to the uploader side for review, and receive a new review result fed back by the uploader side.

For example, the apparatus further includes a text description information acquisition module and a voice-over instruction module. The text description information acquisition module is configured to before the voice-over actor side is controlled to play the first online video on the voice-over recording page, acquire text description information corresponding to the target video clip, where the text description information is obtained by recognizing video content of the target video clip through a preset machine learning model, or the text description information is provided by the uploader. The voice-over instruction module is configured to while the voice-over actor side is controlled to play the target video clip on the voice-over recording page, control the voice-over actor side to display the text description information corresponding to the currently played target video clip on the voice-over recording page, and instruct the voice-over actor to provide a voice-over referring to the text description information.

For example, the apparatus further includes a voice-over request reception module and a voice-over entry opening module. The voice-over request reception module is configured to before it is detected that the voice-over entry corresponding to the first online video is triggered, receive a voice-over adding request for the first online video sent by the voice-over actor side, and forward the voice-over adding request to the uploader side. The voice-over entry opening module is configured to, when voice-over authorization information from the uploader side is received, open the voice-over entry corresponding to the first online video to the voice-over actor side.

For example, the apparatus further includes a voice-over entry opening request reception module, a voice-over invitation sending module and a voice-over entry provision module. The voice-over entry opening request reception module is configured to before it is detected that the voice-over entry corresponding to the first online video is triggered, receive a voice-over entry opening request for the first online video sent by the uploader side. The voice-over invitation sending module is configured to send a voice-over invitation to the voice-over actor side according to the voice-over entry opening request. The voice-over entry provision module is configured to, after it is detected that the voice-over actor accepts the voice-over invitation, provide the voice-over entry corresponding to the first online video for the voice-over actor side.

For example, the apparatus further includes a voice-over video playing module. The voice-over video playing module is configured to, after the first voice-over video is published, play the first voice-over video corresponding to the first online video on an audience side.

For example, the step in which the first voice-over video corresponding to the first online video is played on the audience side includes the step described below. In the process of playing the first online video on the audience side, when it is detected that a preset switching condition is satisfied, the first voice-over video is switched to for playing.

For example, the preset switching condition includes: detecting that the audience side receives a first operation that conforms to an operation manner for blind or visually impaired people; detecting that the audience side receives a preset speech switching command; or determining that the audience side detects no gaze information of a current audience within preset duration.

For example, the apparatus further includes a first evaluation information reception module, a tag information determination module and a tag information provision module. The first evaluation information reception module is configured to receive fed-back evaluation information sent by the audience side for multiple voice-over videos corresponding to the first online video. The tag information determination module is configured to determine tag information corresponding to the multiple voice-over videos, respectively, according to the evaluation information. The tag information provision module is configured to provide tag information corresponding to a current voice-over video while the current voice-over video corresponding to the first online video is presented.

For example, the apparatus further includes a second evaluation information reception module, an evaluation score determination module and a voice-over adding capability assessment module. The second evaluation information reception module is configured to receive fed-back evaluation information sent by the audience side for multiple voice-over videos corresponding to the first online video. The evaluation score determination module is configured to determine evaluation scores corresponding to the multiple voice-over videos, respectively, according to the evaluation information. The voice-over adding capability assessment module is configured to assess voice-over adding capabilities of voice-over actors according to the evaluation scores.

Figure 8:
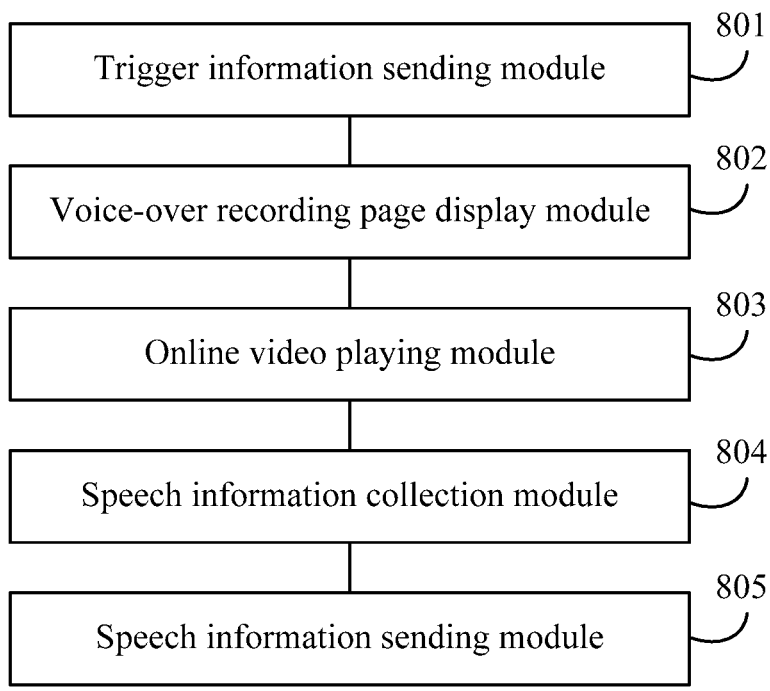
FIG. 8 is a block diagram of a video processing apparatus according to an embodiment of the present disclosure.

FIG. 8 is a block diagram of a video processing apparatus according to an embodiment of the present disclosure. The apparatus may be implemented by software and/or hardware, and may generally be integrated into computer devices. The apparatus may perform video processing by executing a video processing method. As shown in FIG. 8, the apparatus includes a trigger information sending module 801, a voice-over recording page display module 802, an online video playing module 803, a speech information acquisition module 804 and a speech information sending module 805.

The trigger information sending module 801 is configured to, in response to a trigger operation by a voice-over actor on a voice-over entry corresponding to a first online video, send trigger information to a server side, where the trigger information is used for instructing the server side to confirm that it is detected that the voice-over entry corresponding to the first online video is triggered.

The voice-over recording page display module 802 is configured to, in response to a voice-over recording page display instruction for the first online video sent by the server side, load and display a voice-over recording page corresponding to the first online video.

The online video playing module 803 is configured to receive video stream data corresponding to the first online video sent by the server side, and play the first online video on the voice-over recording page.

The speech information collection module 804 is configured to collect speech information of the voice-over actor in a process of playing a target video clip in the first online video, where the target video clip does not include a speech feature.

The speech information sending module 805 is configured to send the collected speech information to the server side, where the speech information is used for instructing the server side to perform: generating a corresponding first voice-over video according to the speech information and the first online video, sending the first voice-over video to an uploader side corresponding to the first online video for review by an uploader, receiving a review result fed back by the uploader side, and when the review result satisfies a preset requirement, publishing the first voice-over video.

According to the video processing apparatus provided in the embodiment of the present disclosure, other users other than the uploader may be allowed as voice-over actors to add voice-overs to the online video uploaded by the uploader, so that the functions of the online video playing platform are enriched, and richer interaction manners are provided for users. Moreover, the voice-over video obtained after voice-over adding is published after being reviewed by the uploader, so that for blind or visually impaired people or other audiences who have difficulty watching video images, the understanding of the video content can be enhanced, and thus the information transmission efficiency of the online video is effectively enhanced and the range of audiences is extended.

Figure 9:
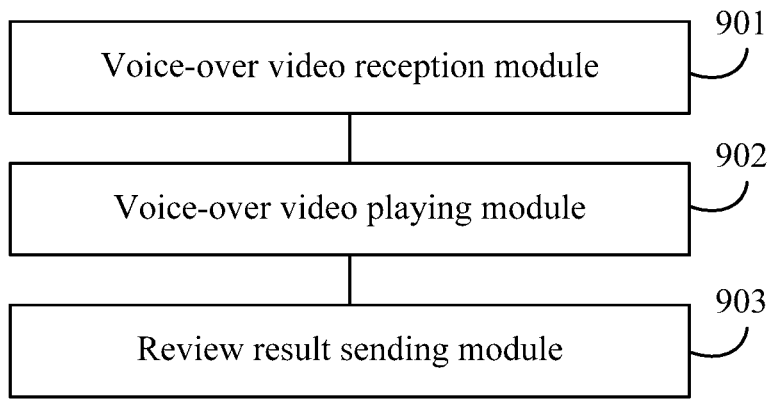
FIG. 9 is a block diagram of a video processing apparatus according to an embodiment of the present disclosure.

FIG. 9 is a block diagram of a video processing apparatus according to an embodiment of the present disclosure. The apparatus may be implemented by software and/or hardware, and may generally be integrated into computer devices. The apparatus may perform video processing by executing a video processing method. As shown in FIG. 9, the apparatus includes a voice-over video reception module 901, a voice-over video playing module 902 and a review result sending module 903.

The voice-over video reception module 901 is configured to receive a first voice-over video sent by a server side, where the first voice-over video is generated by the server side according to speech information of a voice-over actor and a first online video uploaded by an uploader, the speech information is collected by a voice-over actor side in a process of playing a target video clip in the first online video, and in a case where the server side detects that a voice-over entry corresponding to the first online video is triggered, the server side provides a voice-over recording page corresponding to the first online video for the voice-over actor side and controls the voice-over actor side to play the first online video on the voice-over recording page, where the target video clip does not include a speech feature.

The voice-over video playing module 902 is configured to play the first voice-over video and instruct the uploader to review the first voice-over video.

The review result sending module 903 is configured to receive a review result input by the uploader, and feed back the review result to the server side, where the review result is used for instructing the server side to publish the first voice-over video in a case where the review result satisfies a preset requirement.

According to the video processing apparatus provided in the embodiment of the present disclosure, after other users other than the uploader, as voice-over actors, add voice-overs to the online video uploaded by the uploader, the uploader may review voice-over videos, and the voice-over videos may be published when the review result satisfies the preset requirement, so that the functions of the online video playing platform are enriched, and richer interaction manners are provided for users. Moreover, for blind or visually impaired people or other audiences who have difficulty watching video images, the understanding of the video content can be enhanced, and thus the information transmission efficiency of the online video is effectively enhanced and the range of audiences is extended.

Figure 10:
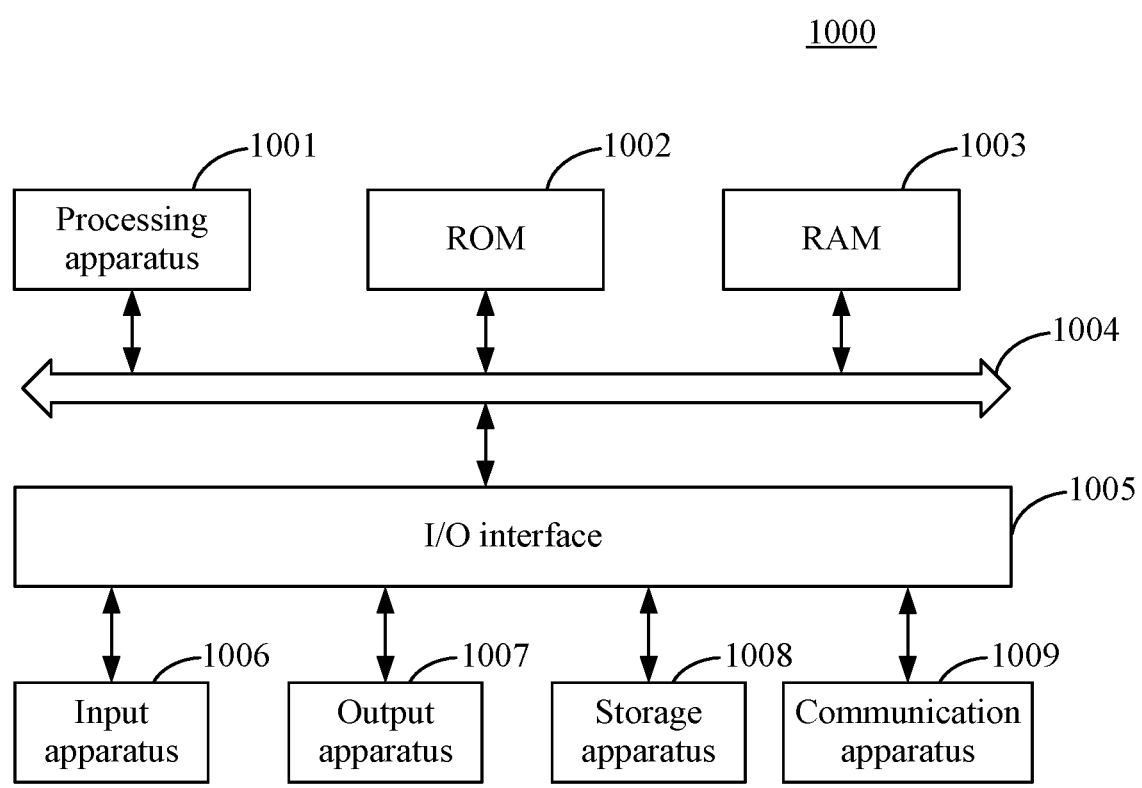
FIG. 10 is a block diagram of a computer device according to an embodiment of the present disclosure.

Referring to FIG. 10, FIG. 10 shows a structural diagram of a computer device 1000 that can implement an embodiment of the present disclosure. The computer device of this embodiment of the present disclosure may include, but is not limited to, a mobile terminal or a fixed terminal. The mobile terminal may be, for example, a mobile phone, a laptop, a digital radio receiver, a personal digital assistant (PDA), a tablet computer, a portable media player (PMP) or a vehicle-mounted terminal (such as a vehicle-mounted navigation terminal). The fixed terminal may be, for example, a digital television (DTV) or a desktop computer. The computer device shown in FIG. 10 is merely an example and should not impose any limitation to the function and usage scope of the embodiments of the present disclosure.

As shown in FIG. 10, the computer device 1000 may include a processing apparatus 1001 (such as a central processing unit or a graphics processing unit). The processing apparatus 1001 may perform various types of appropriate operations and processing according to a program stored in a read-only memory (ROM) 1002 or a program loaded from a storage apparatus 1008 to a random-access memory (RAM) 1003. The RAM 1003 also stores various programs and data required for the operation of the computer device 1000. The processing apparatus 1001, the ROM 1002, and the RAM 1003 are connected to each other through a bus 1004. An input/output (I/O) interface 1005 is also connected to the bus 1004.

Generally, the following apparatuses may be connected to the I/O interface 1005: an input apparatus 1006 such as a touch screen, a touchpad, a keyboard, a mouse, a camera, a microphone, an accelerometer and a gyroscope; an output apparatus 1007 such as a liquid crystal display (LCD), a speaker and a vibrator; the storage apparatus 1008 such as a magnetic tape and a hard disk; and a communication apparatus 1009. The communication apparatus 1009 may allow the computer device 1000 to perform wireless or wired communication with other devices to exchange data. Although FIG. 10 illustrates the computer device 1000 having various apparatuses, it is to be understood that not all of the illustrated apparatuses need to be implemented or present. Alternatively, more or fewer apparatuses may be implemented.

For example, according to the embodiments of the present disclosure, the processes described above with reference to the flowcharts may be implemented as computer software programs. For example, an embodiment of the present disclosure includes a computer program product. The computer program product includes a computer program carried on a non-transitory computer-readable medium. The computer program includes program codes for performing the methods illustrated in the flowcharts. In such an embodiment, the computer program may be downloaded and installed from a network via the communication apparatus 1009, or may be installed from the storage apparatus 1008, or may be installed from the ROM 1002. When the computer program is executed by the processing apparatus 1001, the preceding functions defined in the methods according to the embodiments of the present disclosure are performed.

It is to be noted that the preceding computer-readable medium in the present disclosure may be a computer-readable signal medium or a computer-readable storage medium or any combination thereof. The computer-readable storage medium may be, for example, but not limited to, an electrical, magnetic, optical, electromagnetic, infrared or semiconductor system, apparatus or device or any combination thereof. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical memory device, a magnetic memory device or any appropriate combination thereof. In the present disclosure, the computer-readable storage medium may be any tangible medium including or storing a program.

The program may be used by or in conjunction with an instruction execution system, apparatus or device. In the present disclosure, the computer-readable signal medium may include a data signal propagated in baseband or as part of a carrier wave, where computer-readable program codes are carried in the data signal. The data signal propagated in this manner may be in various forms, including, but not limited to, an electromagnetic signal, an optical signal or any appropriate combination thereof. The computer-readable signal medium may also be any computer-readable medium other than the computer-readable storage medium. The computer-readable signal medium may send, propagate or transmit a program used by or in conjunction with an instruction execution system, apparatus or device. The program codes included on the computer-readable medium may be transmitted via any appropriate medium including, but not limited to, an electrical wire, an optical cable, radio frequency (RF) or any appropriate combination thereof.

The preceding computer-readable medium may be included in the preceding computer device or may exist alone without being assembled into the computer device.

The preceding computer-readable medium carries one or more programs which, when executed by the computer device, cause the computer device to perform any video processing method provided in the embodiments of the present disclosure.

Computer program codes for performing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings illustrate possible architectures, functions and operations of the system, method and computer program product according to the embodiments of the present disclosure. In this regard, each block in the flowcharts or block diagrams may represent a module, a program segment or portion of code. The module, program segment or portion of code contains one or more executable instructions for implementing specified logical functions. It is also to be noted that in some alternative implementations, the functions marked in the blocks may be implemented in an order different from those marked in the drawings. For example, two successive blocks may, in fact, be performed substantially in parallel or in a reverse order, depending on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The described modules involved in the embodiments of the present disclosure may be implemented in software or in hardware. The names of the modules do not constitute a limitation on the modules themselves. For example, a voice-over video publishing module may also be described as "a module for publishing a first voice-over video when a review result satisfies a preset requirement".

The functions described herein may be performed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program used by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any appropriate combination thereof. More specific examples of the machine-readable storage medium may include an electrical connection with one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical memory device, a magnetic memory device or any appropriate combination thereof.

According to one or more embodiments of the present disclosure, a video processing method is provided. The method is applied to a server side and includes steps described below.

When it is detected that a voice-over entry corresponding to a first online video is triggered, a voice-over recording page corresponding to the first online video is provided for a voice-over actor side.

The voice-over actor side is controlled to play the first online video on the voice-over recording page, and speech information of a voice-over actor collected by the voice-over actor side in a process of playing a target video clip in the first online video is acquired, where the target video clip does not include a speech feature.

A corresponding first voice-over video is generated according to the speech information and the first online video.

The first voice-over video is sent to an uploader side corresponding to the first online video for review by an uploader, and a review result fed back by the uploader side is received.

When the review result satisfies a preset requirement, the first voice-over video is published.

For example, the step in which the first voice-over video is sent to the uploader side corresponding to the first online video for review by the uploader includes steps described below.

A voice-over effect of the first voice-over video is assessed.

An assessment result and the first voice-over video are sent to the uploader side corresponding to the first online video for review by the uploader.

For example, the step in which the voice-over effect of the first voice-over video is assessed includes the step described below.

The voice-over effect of the first voice-over video is assessed based on at least one of following dimensions: a matching degree between oral content and video content which correspond to the same target video clip, a matching degree between voice-over duration and video duration which correspond to the same target video clip, an overlap degree between oral content of the target video clip and lines in the online video, or whether a voice-over tone satisfies a preset tone requirement.

For example, the step in which the voice-over effect of the first voice-over video is assessed based on the matching degree between the oral content and the video content which correspond to the same target video clip includes the step described below.

For a current target video clip, a display object that appears in the current target video clip is recognized, a described object that appears in corresponding oral content is recognized, and whether the display object and the described object are consistent is determined; if the display object and the described object are consistent, an assessment score is high; if the display object and the described object are not consistent, an assessment score is low.

The step in which the voice-over effect of the first voice-over video is assessed based on the matching degree between the voice-over duration and the video duration which correspond to the same target video clip includes the step described below.

For a current target video clip, whether a difference between video duration of the current target video clip and voice-over duration corresponding to the current target video clip is within a first preset duration range is determined; if the difference is within the first preset duration range, an assessment score is high; if the difference is not within the first preset duration range, an assessment score is low.

The step in which the voice-over effect of the first voice-over video is assessed based on the overlap degree between the oral content of the target video clip and the lines in the first online video includes the step described below.

For a current target video clip, whether an overlap degree between oral content corresponding to the current target video clip and lines within a preset range of the first online video is less than a preset overlap degree threshold is determined; if the overlap degree is less than the preset overlap degree threshold, an assessment score is high; if the overlap degree is not less than the preset overlap degree threshold, an assessment score is low. The preset range includes a second preset duration range before the current target video clip and a third preset duration range after the current target video clip.

The step in which the voice-over effect of the first voice-over video is assessed based on whether the voice-over tone satisfies the preset tone requirement includes the step described below.

For a current target video clip, whether a fluctuation of voice-over pitch corresponding to the current target video clip is within a preset fluctuation range is determined; if the fluctuation is within the preset fluctuation range, an assessment score is high; if the fluctuation is not within the preset fluctuation range, an assessment score is low.

For example, after the voice-over effect of the first voice-over video is assessed, the step described below is further included.

If a first target video clip of which a voice-over tone does not satisfy the preset tone requirement exists, the voice-over tone corresponding to the first target video clip is adjusted by using a preset audio technology so that an adjusted first voice-over video is obtained, and an assessment result is re-determined.

The step in which the assessment result and the first voice-over video are sent to the uploader side corresponding to the first online video for review by the uploader includes the step described below.

The re-determined assessment result and the adjusted first voice-over video are sent to the uploader side corresponding to the first online video for review by the uploader.

For example, the review result includes adjustment suggestion information.

After the review result fed back by the uploader is received, the method further includes steps described below.

A to-be-adjusted clip in the first voice-over video is determined according to the adjustment suggestion information.

The voice-over actor side is controlled to play the to-be-adjusted clip and display adjustment suggestion information corresponding to the to-be-adjusted clip on the voice-over recording page, and rerecorded speech information of the voice-over actor which is collected by the voice-over actor side in the playing process is acquired.

The first voice-over video is adjusted according to the rerecorded speech information so that a corresponding adjusted first voice-over video is generated.

The adjusted first voice-over video is sent to the uploader side for review, and a new review result fed back by the uploader side is received.

For example, before the voice-over actor side is controlled to play the first online video on the voice-over recording page, the steps described below are further included.

Text description information corresponding to the target video clip is acquired, where the text description information is obtained by recognizing video content of the target video clip through a preset machine learning model, or the text description information is provided by the uploader.

Correspondingly, while the voice-over actor side is controlled to play the target video clip on the voice-over recording page, the step described below is further included.

The voice-over actor side is controlled to display the text description information corresponding to the currently played target video clip on the voice-over recording page, and the voice-over actor is instructed to provide a voice-over referring to the text description information.

For example, before it is detected that the voice-over entry corresponding to the first online video is triggered, the steps described below are further included.

A voice-over adding request for the first online video sent by the voice-over actor side is received, and the voice-over adding request is forwarded to the uploader side.

When voice-over authorization information from the uploader side is received, the voice-over entry corresponding to the first online video is opened to the voice-over actor side.

For example, before it is detected that the voice-over entry corresponding to the first online video is triggered, the steps described below are further included.

A voice-over entry opening request for the first online video sent by the uploader side is received.

A voice-over invitation is sent to the voice-over actor side according to the voice-over entry opening request.

After it is detected that the voice-over actor accepts the voice-over invitation, the voice-over entry corresponding to the first online video is provided for the voice-over actor side.

For example, after the first voice-over video is published, the step described below is further included. The first voice-over video corresponding to the first online video is played on an audience side.

For example, the step in which the first voice-over video corresponding to the first online video is played on the audience side includes the step described below.

In the process of playing the first online video on the audience side, when it is detected that a preset switching condition is satisfied, the first voice-over video is switched to for playing.

For example, the preset switching condition includes: detecting that the audience side receives a first operation that conforms to an operation manner for blind or visually impaired people; detecting that the audience side receives a preset speech switching command; or determining that the audience side detects no gaze information of a current audience within preset duration.

For example, the step described below is further included. Fed-back evaluation information for multiple voice-over videos corresponding to the first online video is received, where the evaluation information is sent by an audience side.

Tag information corresponding to the multiple voice-over videos, respectively, is determined according to the evaluation information.

Tag information corresponding to a current voice-over video is provided while the current voice-over video corresponding to the first online video is presented.

For example, the step described below is further included. Fed-back evaluation information for multiple voice-over videos corresponding to the first online video is received, where the evaluation information is sent by an audience side.

Evaluation scores corresponding to the multiple voice-over videos, respectively, are determined according to the evaluation information.

Voice-over adding capabilities of voice-over actors are assessed according to the evaluation scores.

According to one or more embodiments of the present disclosure, a video processing method is provided. The method is applied to a voice-over actor side and includes steps described below.

In response to a trigger operation by a voice-over actor on a voice-over entry corresponding to a first online video, trigger information is sent to a server side, where the trigger information is used for instructing the server side to confirm that it is detected that the voice-over entry corresponding to the first online video is triggered.

In response to a voice-over recording page display instruction for the first online video sent by the server side, a voice-over recording page corresponding to the first online video is loaded and displayed.

Video stream data corresponding to the first online video sent by the server side is received, and the first online video is played on the voice-over recording page.

Speech information of the voice-over actor is collected in a process of playing a target video clip in the first online video, where the target video clip does not include a speech feature.

The collected speech information is sent to the server side, where the speech information is used for instructing the server side to perform: generating a corresponding first voice-over video according to the speech information and the first online video, sending the first voice-over video to an uploader side corresponding to the first online video for review by an uploader, receiving a review result fed back by the uploader side, and when the review result satisfies a preset requirement, publishing the first voice-over video.

According to one or more embodiments of the present disclosure, a video processing method is provided. The method is applied to an uploader side and includes steps described below.

A first voice-over video sent by a server side is received, where the first voice-over video is generated by the server side according to speech information of a voice-over actor and a first online video uploaded by an uploader, the speech information is collected by a voice-over actor side in a process of playing a target video clip in the first online video, and when the server side detects that a voice-over entry corresponding to the first online video is triggered, a voice-over recording page corresponding to the first online video is provided for the voice-over actor side and the voice-over actor side is controlled to play the first online video on the voice-over recording page, where the target video clip does not include a speech feature.

The first voice-over video is played and the uploader is instructed to review the first voice-over video.

A review result input by the uploader is received, and the review result is fed back to the server side, where the review result is used for instructing the server side to publish the first voice-over video in a case where the review result satisfies a preset requirement.

According to one or more embodiments of the present disclosure, a video processing apparatus is provided. The apparatus is configured at a server side and includes a voice-over recording page provision module, a speech information acquisition module, a voice-over video generation module, a review result reception module and a voice-over video publishing module.

The voice-over recording page provision module is configured to, when it is detected that a voice-over entry corresponding to a first online video is triggered, provide a voice-over recording page corresponding to the first online video for a voice-over actor side.

The speech information acquisition module is configured to control the voice-over actor side to play the first online video on the voice-over recording page, and acquire speech information of a voice-over actor collected by the voice-over actor side in a process of playing a target video clip in the first online video, where the target video clip does not include a speech feature.

The voice-over video generation module is configured to generate a corresponding first voice-over video according to the speech information and the first online video.

The review result reception module is configured to send the first voice-over video to an uploader side corresponding to the first online video for review by an uploader, and receive a review result fed back by the uploader side.

The voice-over video publishing module is configured to, when the review result satisfies a preset requirement, publish the first voice-over video.

According to one or more embodiments of the present disclosure, a video processing apparatus is provided. The apparatus is configured at a voice-over actor side and includes a trigger information sending module, a voice-over recording page display module, an online video playing module, a speech information acquisition module and a speech information sending module.

The trigger information sending module is configured to, in response to a trigger operation by a voice-over actor on a voice-over entry corresponding to a first online video, send trigger information to a server side, where the trigger information is used for instructing the server side to confirm that it is detected that the voice-over entry corresponding to the first online video is triggered.

The voice-over recording page display module is configured to, in response to a voice-over recording page display instruction for the first online video sent by the server side, load and display a voice-over recording page corresponding to the first online video.

The online video playing module is configured to receive video stream data corresponding to the first online video sent by the server side, and play the first online video on the voice-over recording page.

The speech information collection module is configured to collect speech information of the voice-over actor in a process of playing a target video clip in the first online video, where the target video clip does not include a speech feature.

The speech information sending module is configured to send the collected speech information to the server side, where the speech information is used for instructing the server side to perform: generating a corresponding first voice-over video according to the speech information and the first online video, sending the first voice-over video to an uploader side corresponding to the first online video for review by an uploader, receiving a review result fed back by the uploader side, and when the review result satisfies a preset requirement, publishing the first voice-over video.

According to one or more embodiments of the present disclosure, a video processing apparatus is provided. The apparatus is configured at an uploader side and includes a voice-over video reception module, a voice-over video playing module and a review result sending module.

The voice-over video reception module is configured to receive a first voice-over video sent by a server side, where the first voice-over video is generated by the server side according to speech information of a voice-over actor and a first online video uploaded by an uploader, the speech information is collected by a voice-over actor side in a process of playing a target video clip in the first online video, and in a case where the server side detects that a voice-over entry corresponding to the first online video is triggered, the server side provides a voice-over recording page corresponding to the first online video for the voice-over actor side and controls the voice-over actor side to play the first online video on the voice-over recording page, where the target video clip does not include a speech feature.

The voice-over video playing module is configured to play the first voice-over video and instruct the uploader to review the first voice-over video.

The review result sending module is configured to receive a review result input by the uploader, and feed back the review result to the server side, where the review result is used for instructing the server side to publish the first voice-over video in a case where the review result satisfies a preset requirement.

The preceding description is merely illustrative of example embodiments of the present disclosure. It is to be understood by those skilled in the art that the scope of disclosure involved in the present disclosure is not limited to the technical solutions formed by particular combinations of the preceding technical features and should also cover other technical solutions formed by any combination of the preceding technical features or their equivalents without departing from the concept of the present disclosure, for example, technical solutions formed by the substitutions of the preceding features with the technical features (not limited to being) disclosed in the present disclosure and having similar functions.

In addition, although operations are illustrated in a particular order, it should not be construed as that the operations are required to be performed in the particular order shown or in a sequential order. In certain circumstances, multitasking and parallel processing may be advantageous. Similarly, although several specific implementation details are included in the preceding discussion, these should not be construed as limitations on the scope of the present disclosure. Certain features described in the context of separate embodiments may also be implemented in combination in a single embodiment. Rather, features described in the context of a single embodiment may be implemented in multiple embodiments separately or in any appropriate sub-combination.

What is claimed is:

1. A video processing method, applied to a server side, wherein the video processing method comprises:
   in response to detecting that a voice-over entry corresponding to an online video is triggered, providing a voice-over recording page corresponding to the online video for a voice-over actor-side client;
   controlling the voice-over actor-side client to play the online video on the voice-over recording page, and acquiring speech information of a voice-over actor collected by the voice-over actor-side client in a process of playing a target video clip in the online video, wherein the target video clip does not comprise a speech feature;
   generating a corresponding voice-over video according to the speech information and the online video;
   sending the voice-over video to an uploader-side client corresponding to the online video for review by an uploader, and receiving a review result fed back by the uploader-side client; and
   in response to determining that the review result satisfies a preset requirement, publishing the voice-over video,
   wherein sending the voice-over video to the uploader-side client corresponding to the online video for review by the uploader comprises:
   assessing a voice-over effect of the voice-over video; and
   sending an assessment result and the voice-over video to the uploader-side client corresponding to the online video for review by the uploader.

2. The method according to claim 1, wherein assessing the voice-over effect of the voice-over video comprises:

assessing the voice-over effect of the voice-over video based on at least one of following dimensions:
a matching degree between oral content and video content which correspond to a same target video clip, a matching degree between voice-over duration and video duration which correspond to a same target video clip, an overlap degree between oral content of the target video clip and lines in the online video, or whether a voice-over tone satisfies a preset tone requirement.

3. The method according to claim 2, wherein
assessing the voice-over effect of the voice-over video based on the matching degree between the oral content and the video content which correspond to the same target video clip comprises:
for a current target video clip, recognizing a display object that appears in the current target video clip, recognizing a described object that appears in corresponding oral content, and determining whether the display object and the described object are consistent;
determining that an assessment score is high based on a determination result that the display object and the described object are consistent, or determining that an assessment score is low based on a determination result that the display object and the described object are not consistent;
assessing the voice-over effect of the voice-over video based on the matching degree between the voice-over duration and the video duration which correspond to the same target video clip comprises:
for a current target video clip, determining whether a difference between video duration of the current target video clip and voice-over duration corresponding to the current target video clip is within a first preset duration range;
determining that an assessment score is high based on a determination result that the difference is within the first preset duration range, or determining that an assessment score is low based on a determination result that the difference is not within the first preset duration range;
assessing the voice-over effect of the voice-over video based on the overlap degree between the oral content of the target video clip and the lines in the online video comprises:
for a current target video clip, determining whether an overlap degree between oral content corresponding to the current target video clip and lines within a preset range of the online video is less than a preset overlap degree threshold;
determining that an assessment score is high based on a determination result that the overlap degree is less than the preset overlap degree threshold, or determining that an assessment score is low based on a determination result that the overlap degree is greater than or equal to the preset overlap degree threshold, wherein the preset range comprises a second preset duration range before the current target video clip and a third preset duration range after the current target video clip; and
assessing the voice-over effect of the voice-over video based on whether the voice-over tone satisfies the preset tone requirement comprises:
for a current target video clip, determining whether a fluctuation of voice-over pitch corresponding to the current target video clip is within a preset fluctuation range;
determining that an assessment score is high based on a determination result that the fluctuation is within the preset fluctuation range, or determining that an assessment score is low based on a determination result that the fluctuation is not within the preset fluctuation range.

4. The method according to claim 2, after assessing the voice-over effect of the voice-over video, further comprising:
in response to determining that a target video clip of which a voice-over tone does not satisfy the preset tone requirement exists, adjusting the voice-over tone corresponding to the target video clip of which the voice-over tone does not satisfy the preset tone requirement by using a preset audio technology to obtain an adjusted voice-over video, and re-determining an assessment result;
wherein sending the assessment result and the adjusted voice-over video to the uploader-side client corresponding to the online video for review by the uploader comprises:
sending the re-determined assessment result and the adjusted voice-over video to the uploader-side client corresponding to the online video for review by the uploader.

5. The method according to claim 1, wherein the review result comprises adjustment suggestion information; and
after receiving the review result fed back by the uploader-side client, the method further comprises:
determining a to-be-adjusted clip in the voice-over video according to the adjustment suggestion information;
controlling the voice-over actor-side client to play the to-be-adjusted clip and display adjustment suggestion information corresponding to the to-be-adjusted clip on the voice-over recording page, and acquiring rerecorded speech information of the voice-over actor which is collected by the voice-over actor-side client in the playing process;
adjusting the voice-over video according to the rerecorded speech information to generate a corresponding adjusted voice-over video; and
sending the adjusted voice-over video to the uploader-side client for review, and receiving a new review result fed back by the uploader-side client.

6. The method according to claim 1, before controlling the voice-over actor-side client to play the online video on the voice-over recording page, further comprising:
acquiring text description information corresponding to the target video clip, wherein the text description information is obtained by recognizing video content of the target video clip through a preset machine learning model, or the text description information is provided by the uploader; and
correspondingly, while controlling the voice-over actor-side client to play the target video clip on the voice-over recording page, further comprising:
controlling the voice-over actor-side client to display the text description information corresponding to a current target video clip on the voice-over recording page, and instructing the voice-over actor to provide a voice-over referring to the text description information.

7. The method according to claim 1, before detecting that the voice-over entry corresponding to the online video is triggered, further comprising:
receiving a voice-over adding request for the online video sent by the voice-over actor-side client, and forwarding the voice-over adding request to the uploader-side client; and
in a case of receiving voice-over authorization information from the uploader-side client, opening the voiceover entry corresponding to the online video to the voice-over actor-side client.

8. The method according to claim 1, before detecting that the voice-over entry corresponding to the online video is triggered, further comprising:
receiving a voice-over entry opening request for the online video sent by the uploader-side client;
sending a voice-over invitation to the voice-over actor-side client according to the voice-over entry opening request; and
after detecting that the voice-over actor accepts the voice-over invitation, providing the voice-over entry corresponding to the online video for the voice-over actor-side client.

9. The method according to claim 1, after publishing the voice-over video, further comprising:
playing the voice-over video corresponding to the online video on an audience side.

10. The method according to claim 9, wherein playing the voice-over video corresponding to the online video on the audience side comprises:
in a process of playing the online video on the audience side, in response to detecting that a preset switching condition is satisfied, switching to the voice-over video for playing;
wherein the preset switching condition comprises one of:
detecting that an audience-side client receives an operation that conforms to an operation manner for blind or visually impaired people; detecting that an audience-side client receives a preset speech switching command; or determining that an audience-side client detects no gaze information of a current audience within preset duration.

11. The method according to claim 1, further comprising:
receiving fed-back evaluation information for a plurality of voice-over videos corresponding to the online video, wherein the evaluation information is sent by an audience side;
determining tag information corresponding to the plurality of voice-over videos, respectively, according to the evaluation information; and
providing tag information corresponding to a current voice-over video while presenting the current voice-over video corresponding to the online video.

12. The method according to claim 1, further comprising:
receiving fed-back evaluation information for a plurality of voice-over videos corresponding to the online video, wherein the evaluation information is sent by an audience side;
determining evaluation scores corresponding to the plurality of voice-over videos, respectively, according to the evaluation information; and
assessing voice-over adding capabilities of voice-over actors according to the evaluation scores.

13. A video processing method, applied to a voice-over actor-side client, wherein the video processing method comprises:
in response to a trigger operation by a voice-over actor on a voice-over entry corresponding to an online video, sending trigger information to a server side, wherein the trigger information is used for instructing the server side to confirm that it is detected that the voice-over entry corresponding to the online video is triggered;
in response to a voice-over recording page display instruction for the online video sent by the server side, loading and displaying a voice-over recording page corresponding to the online video;
receiving video stream data corresponding to the online video sent by the server side, and playing the online video on the voice-over recording page;
collecting speech information of the voice-over actor in a process of playing a target video clip in the online video, wherein the target video clip does not comprise a speech feature; and
sending the collected speech information to the server side, wherein the speech information is used for instructing the server side to perform: generating a corresponding voice-over video according to the speech information and the online video, sending the voice-over video to an uploader-side client corresponding to the online video for review by an uploader, receiving a review result fed back by the uploader-side client, and in response to determining that the review result satisfies a preset requirement, publishing the voice-over video,
wherein sending the voice-over video to the uploader-side client corresponding to the online video for review by the uploader comprises:
assessing a voice-over effect of the voice-over video; and
sending an assessment result and the voice-over video to the uploader-side client corresponding to the online video for review by the uploader.

14. A video processing method, applied to an uploader-side client, wherein the video processing method comprises:
receiving a voice-over video sent by a server side, wherein the voice-over video is generated by the server side according to speech information of a voice-over actor and an online video uploaded by an uploader, the speech information is collected by a voice-over actor-side client in a process of playing a target video clip in the online video, and in a case where the server side detects that a voice-over entry corresponding to the online video is triggered, the server side provides a voice-over recording page corresponding to the online video for the voice-over actor-side client and controls the voice-over actor-side client to play the online video on the voice-over recording page, wherein the target video clip does not comprise a speech feature;
playing the voice-over video and instructing the uploader to review the voice-over video; and
receiving a review result input by the uploader, and feeding back the review result to the server side, wherein the review result is used for instructing the server side to publish the voice-over video in a case where the review result satisfies a preset requirement.

15. A non-transitory computer-readable storage medium configured to store a computer program which, when executed by a processor, causes the processor to implement the method according to claim 1.

16. A computer device, comprising a memory, a processor and a computer program stored in the memory and executable by the processor, wherein the computer program, when executed by the processor, causes the processor to implement the method according to claim 1.

17. The storage medium according to claim 15, wherein the computer program causes the processor to implement sending the voice-over video to the uploader-side client corresponding to the online video for review by the uploader by:
assessing a voice-over effect of the voice-over video; and
sending an assessment result and the voice-over video to the uploader-side client corresponding to the online video for review by the uploader.

18. The storage medium according to claim 17, wherein the computer program causes the processor to implement assessing the voice-over effect of the voice-over video by:
    assessing the voice-over effect of the voice-over video based on at least one of following dimensions:
    a matching degree between oral content and video content which correspond to a same target video clip, a matching degree between voice-over duration and video duration which correspond to a same target video clip, an overlap degree between oral content of the target video clip and lines in the online video, or whether a voice-over tone satisfies a preset tone requirement.

19. The computer device according to claim 16, wherein the computer program causes the processor to implement sending the voice-over video to the uploader-side client corresponding to the online video for review by the uploader by:
    assessing a voice-over effect of the voice-over video; and
    sending an assessment result and the voice-over video to the uploader-side client corresponding to the online video for review by the uploader.

\* \* \* \* \*